United States Patent [19]
Narimatsu et al.

[11] Patent Number: 5,826,236
[45] Date of Patent: Oct. 20, 1998

[54] METHOD FOR ALLOCATING RESOURCES AND PROCESSES FOR DESIGN AND PRODUCTION PLAN SCHEDULING

[75] Inventors: Katsumi Narimatsu, Kawasaki; Shoichi Kojima, Fujisawa, both of Japan

[73] Assignee: Kabushiki Kaisha Toshiba, Kawasaki, Japan

[21] Appl. No.: 569,773

[22] Filed: Dec. 8, 1995

[30] Foreign Application Priority Data

Dec. 9, 1994 [JP] Japan .................................. 6-306516
Sep. 27, 1995 [JP] Japan .................................. 7-249746

[51] Int. Cl.⁶ ........................... G06F 17/60; G06F 17/50
[52] U.S. Cl. ........................... 705/8; 205/7; 364/468.05; 364/468.06; 364/468.15; 364/474.24
[58] Field of Search .................. 364/468.03, 468.05, 364/468.06, 468.15, 474.24; 395/207, 208; 705/7, 8

[56] References Cited

U.S. PATENT DOCUMENTS 4,852,001  7/1989  Tsushima et al. .................. 364/401
5,408,663  4/1995  Miller .................................. 395/650

FOREIGN PATENT DOCUMENTS 6-35920  2/1994  Japan .

OTHER PUBLICATIONS

Morton et al., "Shop Routing", Heuristic Scheduling Systems, Chapter 12, pp. 267–293, 1993.
English translation of relevant portions of PERT (Tomoaki Sekine, PERT CPM, Nikka–girenn).

*Primary Examiner*—Gail O. Hayes
*Assistant Examiner*—William N. Hughet
*Attorney, Agent, or Firm*—Finnegan, Henderson, Farabow, Garrett & Dunner, L.L.P.

[57] ABSTRACT

A scheduling computer system optimizes the match between allocation of processes and resources. To do so, the system temporarily allocates the resources to a process selected based on the attributes of the resources and the processes, as well as the processing start and desired processing end times. In doing so, the system avoids selecting processes to which resources have been already allocated. The system also determines a resulting time value and a resulting fitness value based on the temporary allocation. Using the resulting time value and the resulting fitness value, the system determines the optimum resource for a particular process and allocates the resource to the process accordingly. The system also generates a scheduling chart illustrating the resource allocation.

26 Claims, 13 Drawing Sheets

METHOD FOR ALLOCATING RESOURCES AND PROCESSES FOR DESIGN AND PRODUCTION PLAN SCHEDULING

BACKGROUND OF THE INVENTION

1. Field of the Invention

This invention relates to a scheduling device and method which help create many types of schedules such as those for the development or design projects of various applications or for the production management in plants or other places.

2. Description of the Prior Art

In the development or design projects in many applications or in the production management in plants or other places, scheduling problems have been major issues in plan-applications or plan-making operations. This scheduling problem is defined generally as "a problem which allocates resources and time, required for process execution, to a given job."

In the following discussion, the scheduling problem refers to "who" will do "what job" and "when." And, "what job" is called a "process", "who" is called a "resource", and "when" means a time to perform a process.

There are many scheduling application in various fields. The following focuses on the prior art of project scheduling in two fields: project scheduling and production-plan scheduling. Project scheduling requires the understanding of process sequence because it is complex. On the other hand, production-plan scheduling must take into consideration many restrictions such as those on the facilities or setup times.

To cope with these problems, the prior art uses the following method:

1. Project scheduling

In project scheduling, study has been made traditionally on PERT and CPM (Tomoaki Sekine, PERT CPM. Nikkagirenn). PERT forms a process network that reflects the process sequence and, based on this network, calculates the earliest start time and the latest end time. PERT gives information on the spare time of each process, etc. CPM allows reduction of work time based on the result of PERT. CPM is not explained here because it is not a technique for resource allocation.

Normally, PERT is used with the "resource leveling" method in many papers, "resource leveling" is also called "resource allocation". We define "resource leveling" as performing alternative resource selection in this specification in order to distinguish from general "resource leveling" or "resource allocation". This resource leveling method temporarily determines the work time of each process according to the result of PERT calculation and, when the schedule is found to be impractical under some resource restrictions, sequentially moves processes allocated to a busy time to another period of time.

However, this resource leveling method, which sequentially moves process times considering resource priority or spare times, is used basically for a single resource whose capacity is limited. In project scheduling, for example, a single resource means that a job is allocated to a group (project team), not to individuals. In this case, the capacity is the maximum number of people of a group.

Another known scheduling method for a plurality of resources is RAMPS (Resource Allocation and Multi-Project Scheduling: Refer to the book above). This method, which uses a plural resources such as an "electrical designer group" and "mechanical designer group", creates a schedule using data on the number of designers required for each process. It allows us to create a schedule for a plural resources.

2. Production-plan scheduling

In production-plan scheduling, the schedule unit depends on the production method. That is, in the large variety, small-lot-sized production, the schedule unit is a production process of each order; in the mass production, the schedule unit is a production process of one of lots of a product type. The problem of production-plan scheduling is similar to that of project scheduling in that there are many processes. That is, it is necessary to consider a complex process sequence while considering resource priority and resource ability and to make a schedule. A scheduling method like this is found, for example, in Japanese Non-examined Patent Publication No. 6-35920.

However, in many cases, production-plan scheduling is more complex. For example, we must take into considerations the following restrictions: each process may require two resources, for example a machine and a jig, at the same time, or the one-hour setup time may be required when the same machine processes two or more lots continuously using different jigs. In the mass production, there are sometimes too many lots to be scheduled in one process.

To solve these problems, the following scheduling methods are used. One method is to determine the earliest start time and latest end time of each process based on an estimate of how busy the process will be and how long, including a wait time, it will take to complete and to schedule a process independently so that it ends within the specified latest end time. Another method is to schedule in process sequence; in this case, the end time of a process is used as the start time of the following process. In this method, scheduling is done for single process at a time. Or, even if scheduling is done for some sequence of processes, it is very simple.

Now, consider a scheduling method which takes a setup time into consideration. Also consider that there is the following restriction: "Some processes require a machine as well as a jig, and some products may use the same jig. In this case, exchanging jigs on a machine requires a setup time." Suppose that there are enough jigs. Then, grouping lots using the same jig decreases the setup time and increases the machine efficiency.

However, the whole project may be tardy because a lot, if too large, increases the lot process time but also delays the processing of other lots. This means that two contradicting objects—to increase machine efficiency and to reduce the lot process time—must be considered.

Conventional production-plan scheduling methods to solve this problem include an OR (Operations Research) method, such as the branch-and-bound method or integer programming method, and an expert system which describes a dispatching rule using the IF-THEN rule.

An OR method evaluates a schedule which is the final result. For example, in the above example, this method calculates, for the final scheduling result, the first evaluation criterion which is the sum of working ratios of all machines and the second evaluation criterion which is the sum of project times. In an OR field, the above problem is usually treated as a lot sequencing problem, and many studies have been made on a method to optimize this sequencing. In most cases, a given initial solution is modified to make it an optimum solution.

An expert system method, on the other hand, stores the heuristic knowledge of experienced planners in a knowledge database on the computer for use in simulation on. This method, similar to a procedure a human being uses to schedule, repeatedly selects unallocated processes for allocation. Selection and allocation performed during scheduling are called dispatching, and selection and allocation rules are called dispatching rules. In the AI (Artificial Intelligence) field, scheduling is performed through inference using the IF-THEN rules, which are represented in the following form:

IF-THEN

This rule consists of the IF (condition part) statement and the THEN (conclusion part) statement.

Consider a problem to reduce a setup time. In this example, let the end time of the latest process which each resource is allocated be the end time of the resource, and let the jig used by the process be called the current jig. In this case, allocation is performed according to the following rules:

IF a jig to be used by a process is the current jig of a resource

THEN the resource is allocated to the process

IF there is no process which uses a jig used by each resource currently

THEN the process whose required time is earliest is allocated to the resource whose end time is earliest.

This rule-form representation allows us to build a scheduling system easier. In many of scheduling systems currently available, dispatching rules are coded in the IF-THEN rules or some other programming statements. This rule-form scheduling is characterized in that a practical scheduling system may be built without having to find the optimum solution. Because of a reduced amount of calculation compared with that of an OR method, this scheduling method may be applied to a system where there are many machines or priorities are assigned to machines.

A scheduling system using the dispatching rules described above is described in 'HEURISTIC SCHEDULING SYSTEMS Chapter 12, "SHOP ROUTING"; MORTON et al.; 1993.'

PROBLEMS TO BE SOLVED BY THE INVENTION

Conventional scheduling methods have the following problems:

1. Project scheduling

Conventional project scheduling is used to create a schedule considering the capacity of a group, because it is used primarily for construction sites and the like. However, in the case of design work, it is necessary to make a schedule considering the individual designer's ability because the work time depends largely on individual designer's ability and there are works on which some designers cannot work. In a situation where a resource is allocated uniquely to a process, individual designers are allocated to work. In this case, a schedule is made using the resource leveling method with a plurality of resources set up.

Normally, only one person is not always allocated to a specific work; instead, one of many persons is selected. In a situation where there are a plurality of allocatable resources for each process, changing resources changes the load status and, there are a lot of number of combinations of processes and allocatable resources. For example, assume that there are 10 processes to be scheduled and that there are three alternative resources for each allocatable resource. Then, there are a total of about 170,000 resource patterns selectable for each process. It is impossible to resolve if we have to consider all these patterns. However, in reality, there are usually some priority relations; for example, a resource to be selected as much as possible is sometimes not available, and another resource is used for it.

For example, in the above design work, a chief designer, who is assigned to each design item, should work on it as much as possible. However, if we adhere to the restriction that a chief designer should work on the design item, the whole project is delayed. In this case, it is necessary to allocate the design item to the chief designer and then, considering the whole project time, to do resource leveling by moving the process to other resources. However, this leveling method is rather complex. In the conventional leveling method, only the period of time should be considered so that the project completes on or before the completion date. This method requires us to consider, when leveling, not only the period of time but also allocatable resources.

As described above, it is difficult, with the use of the conventional resource leveling method or its extended method, to make a schedule for a problem whose sequence relation is complex while considering both the time factor and the priority of each of a plurality of resources.

2. Production-plan scheduling

When optimizing the sequencing problem with the use of the above-described OR method, a schedule may be created for single machine, but not for a plurality of machines. For a plurality of machines, the method may be applied only to two or three machines. In most cases, a study is being made, not on a plurality of processes, but on a single process.

This OR method is advantageous in that it gives us an optimum solution and its object is clear, because it represents a scheduling target with the use of an evaluation function for the final result. However, its solution method is complex and cannot be applied to complex problems because of restrictions on calculation times.

With the rule-form representation of the expert system method which is used to specify a condition for a process that is allocated, it is difficult to describe a set of rules for the optimum solution which takes into consideration the machine working ratios or lot process times. An attempt to describe detailed conditions also makes the rule set complex and makes it difficult to build a system. In addition, the expert system method makes it difficult to fine-tune the knowledge to reflect some specific conditions, such as a process relation, a limit on the time delay, or an error in some machines. Because the knowledge structure becomes more complex, it is difficult to build a system which changes its behavior to adapt to data which change day by day.

This invention seeks to solve the problems associated with the prior art described above. It is an object of this invention to provide a scheduling system and a scheduling method which can evaluate the fitness of each of a plurality of fixed-sequenced processes for each alternative resources, evaluate the time factor of processes, and optimize the balance between the fitness and the time factor.

It is another object of this invention to provide a scheduling system and a scheduling method which can optimize the balance between the setup time and the time factor of the processes when allocating a plurality of types of resources to a plurality of processes.

It is still another object of this invention to provide a scheduling system and a scheduling method which can adjust the balance between the fitness and the time factor and the balance between the setup time and the time factor.

SUMMARY OF THE INVENTION

To achieve the above objects, a scheduling system according to claim 1 comprises: resource defining means for defining the attribute, such as an ability, of each of the plurality of resources; process defining means for defining the attribute of each of a plurality of processes which are processed in a predefined sequence; time setting means for setting the processing startable time and desired processing time of a plurality of processes; process selecting means for sequentially selecting a process, to which a resource is to be allocated, from the plurality of processes; temporary allocating means for temporarily allocating a process, selected by the process selecting means, to each of the plurality of resources; first evaluating means for evaluating the end time of a sequence of processes with respect to the desired end time of the corresponding sequence of processes, set by the time setting means, by finding the end time of the sequence of the plurality of processes after the temporary allocation and for defining a resulting time evaluation value as the first criterion; second evaluating means for evaluating the fitness of a resource for a process based on the attribute of the resource and on the attribute of the process and for defining a resulting fitness evaluation value as the second criterion; resource determining means for calculating an evaluation value for the combination of a process and a resource by evaluating both of the first criterion and the second criterion and for determining, based on the evaluation value, the best resource for the process; and process allocating means for allocating a process, selected by the process selecting means, to a resource determined by the resource determining means.

An invention according to claim 18 is a method for the invention as claimed in claim 1. That is, this invention is a scheduling method comprising: a first step for defining the attribute, such as an ability, of each of a plurality of resources; a second step for defining the attribute of each of a plurality of processes which are processed in a predefined sequence; a third step for setting the processing startable time and desired processing time of the plurality of processes; a fourth step for sequentially selecting a process, which is to be allocated to a resource, from the plurality of processes; a fifth step for temporarily allocating a process, selected by the fourth step, to each of the plurality of resources; a sixth step for evaluating the end time of a sequence of processes with respect to the desired end time of the corresponding sequence of processes, set by the third step, by finding the end time of the sequence of the plurality of processes after the temporary allocation and for defining a resulting time evaluation value as the first criterion; a seventh step for evaluating the fitness of a resource for a process based on the attribute of the resource and on the attribute of the process and for defining a resulting fitness evaluation value as the second criterion; an eighth step for calculating an evaluation value for the combination of a process and a resource by evaluating both of the first criterion and the second criterion and for determining, based on the evaluation value, the best resource for the process; and a ninth step for sequentially allocating a process, selected by the step fourth, to a resource determined by the step eighth.

According to the inventions as claimed in claims 1 and 18, each of alternative resources is allocated to any of a plurality of processes. In this case, it is assumed that each combination of a process and a resource has its own level of fitness. More specifically, this level of fitness determines at what process each resource is good or how well each process is processed by each resource. Various factors such as efficiency depend on a process to which each resource is allocated. On the other hand, allocation based only on the fitness may cause a tardy schedule.

To solve this problem, this invention temporarily allocates a process to each resource and finds the end time of each subsequent process, especially the end time of a sequence of consecutive processes, to evaluate the desired processing time which is the desired end time. This time evaluation, represented as a numeric value, is used as the first criterion, and the fitness, represented as a numeric value, is used as the second criterion. The invention evaluates the first criterion and the second criterion to determine the best combination of processes and resources.

Evaluating the fitness of each process for each resource while considering the time factor allows the user to make a schedule which well balances the fitness and the time factor.

A scheduling system according to claim 2 is a scheduling system as claimed in claim 1, wherein the time setting means sets the processing startable time and desired processing time of a sequence of the plural processes.

According to the invention as claimed in claim 2, because the processing startable time and desired processing time are set for a sequence of a plurality of processes, time data entry becomes easy.

A scheduling system according to claim 3 is a scheduling system as claimed in claim 1, wherein the time setting means sets a processing startable time and a desired processing end time of each of plural of processes.

According to the invention as claimed in claim 3, a processing startable time and a desired processing time may be set for each process of a sequence of a plurality of processes.

A scheduling system according to claim 4 is a scheduling system as claimed in claim 1, further comprising first weight setting means for setting the first weight for determining a balance in the evaluation between the first criterion and the second criterion, wherein the resource determining means uses the first weight when evaluating the first criterion and second criterion.

An invention according to claim 19 is a method for the invention as claimed in claim 4. That is, this is a scheduling method as claimed in claim 18, further comprising a tenth step or setting the first weight for determining a balance in the evaluation between the first criterion and the second criterion, wherein the step eighth uses the first weight when evaluating the first criterion and second criterion.

According to the inventions as claimed in claims 4 and 19, the first weight is considered when evaluating the fitness of processes for resources to balance the first criterion and the second criterion. This determines the best combination of processes and resources.

A scheduling system according to claim 5 is a scheduling system as claimed in claim 4, further comprising weight modifying means for modifying the first weight, set by the first weight setting means, according to a change of criteria in the evaluation criteria, when the criteria in at least one of a time evaluation value, created by the first evaluating means, and a fitness evaluation value, created by the second evaluating means, must be changed.

An invention according to claim 20 is a method for the invention as claimed in claim 5. That is, this is a scheduling method as claimed in claim 19, further comprising a eleventh step for modifying the first weight, set by the tenth step, according to a change of criteria in the evaluation criteria, when the criteria in at least one of a time evaluation value, created by the sixth step, and a fitness evaluation value, created by the seventh step, must be changed.

According to the inventions as claimed in claims 5 and 20, the first weight is modified according to the relation between processes, a limit on the time delay, and a failure in a specific resource. This makes it possible to create a flexible schedule.

A scheduling system according to claim 6 is a scheduling system as claimed in claim 5, wherein the process selecting means calculates the evaluation value using the earliest start time and the allowable latest end time.

According to the invention as claimed in claim 6, the operation becomes simple because the earliest start time is used as the earliest processing start time and because the latest end time is used as the allowable latest processing time.

A scheduling system according to claim 7 is a scheduling system as claimed in claim 1, wherein the process selecting means calculates an evaluation value, based on the time relation among the plurality of processes, by using the earliest processing start time and the allowable latest processing time of each process and, based on this evaluation value, selects a process.

An invention according to claim 21 is a method for the invention as claimed in claim 7. That is, this is a scheduling method as claimed in claim 18, wherein the fourth step calculates, based on the time relation among the plurality of processes, an evaluation value by using the earliest processing start time and the allowable latest processing time of each process and, based on this evaluation value, selects a process.

According to the inventions as claimed in claims 7 and 21, the earliest processing start time and the allowable latest processing time of each process is evaluated, based on the time relation among a plurality of processes, to select a process. This enables a high priority process with an earlier start time and end time to be selected first.

A scheduling system according to claim 8 is a scheduling system as claimed in claim 1, wherein the process selecting means calculates, based on the time relation among the plurality of processes, an evaluation value by generally evaluating the earliest processing start time and the allowable latest processing time of each process as well as the correlation between the allocation status of each resource and each process at that time and, based on the evaluation value, selects a process.

An invention according to claim 22 is a method for the invention as claimed in claim 8. That is, this is a scheduling method as claimed in claim 18, wherein the fourth step calculates, based on the time relation among the plurality of processes, an evaluation value by generally evaluating the earliest processing start time and the allowable latest processing time of each process as well as the correlation between the allocation status of each resource and each process at that time and, based on the evaluation value, selects a process.

According to the inventions as claimed in claims 8 and 22, an evaluation value is calculated, based on the time relation among a plurality of processes, by generally evaluating the earliest processing start time and the allowable latest processing time of each process as well as the correlation between the allocation status of each resource and each process at that time. This enables the user to select a high priority process with an earlier start time and end time while referring to the allocation status of each resource at that time.

A scheduling system according to claim 9 is a scheduling system as claimed in claim 8, further comprising second weight setting means for determining the correlation between the allocation status of each resource and each process.

A scheduling system according to claim 23 is a scheduling system as claimed in claim 22, further comprising a twelfth step for determining said correlation between the allocation status of each resource and each process.

According to the invention as claimed in claim 9 and 23, the second weight determines the correlation between the allocation status of each resource and each process. This allows the user to determine the correlation according to the status at the time, allowing him to select a process suitable to the status.

A scheduling system according to claim 10 is a scheduling system as claimed in claim 9, further comprising weight modifying means for modifying, when criteria for evaluating the correlation between the allocation status of each resource and each process must be changed, the second weight, set by the second weight setting means, according to a change in the criteria.

According to the invention as claimed in claim 10, a flexible schedule is created by modifying the second weight according to specific conditions, such as the relation between processes, a limit on the time delay, or a failure in a specific resource.

A scheduling system according to claim 11 is a scheduling system as claimed in claim 8, wherein the process selecting means selects a particular point in time between the earliest processing start time and the latest processing time based on the correlation between the status of each resource and each process at that time and determines the evaluation value as the evaluation value.

According to the invention as claimed in claim 11, an evaluation value is calculated based on the correlation between the resource allocation status and each process at that time and on the second weight. This allows the user to select a process suitable for the status.

A scheduling system according to claim 12 is a scheduling system as claimed in claim 8, wherein the process selecting means calculates the evaluation value using the earliest start time and the allowable latest end time.

According to the invention as claimed in claim 12, the operation becomes simple because the earliest start time is used as the earliest processing start time and because the latest end time is used as the allowable latest processing time.

A scheduling system according to claim 13 is a scheduling system as claimed in claim 1, wherein the process defining means defines an additional resource for use in each process in addition to the resources defined by the resource defining means, and the second evaluating means increases the evaluation value of the fitness when two or more processes using the additional resource are allocated consecutively.

An invention according to claim 24 is a method for the invention as claimed in claim 13. That is, this is a scheduling method as claimed in claim 18, wherein the second step defines an additional resource for use in each process in addition to the resources defined by the first step, and the seventh step increases the evaluation value of the fitness when two or more processes using the additional resource are allocated consecutively.

According to the inventions as claimed in claims 13 and 24, a well-balanced, optimum schedule is created as follows.

Assume that processes are allocated to resources when an additional resource, for example a jig, is defined for each of a plurality of processes. In this case, when a plurality of different continuous processes, each using a different type of additional resource, are processed, the time for exchanging additional resources (hereafter called setup time) is necessary between processes. This means that a reduction in the setup time increases the efficiency of resources. However, an attempt to reduce this setup time sometimes causes a specific type of process to be expedited and other processes to be delayed. This may cause a specified number of processes to end behind the schedule.

So, when allocating a selected process to a resource, a check is made to see whether or not the additional resource defined for this process matches that defined for the process allocated last to the resource. This evaluation is used as the second criterion. If two continuous processes allocated to the same resource use the same additional resource, no setup time is necessary.

The end time of each subsequent process, especially the end time of a sequence of subsequent processes, is calculated for the combination of the process and the resource in order to perform time evaluation for the desired end time. This time evaluation, represented as a numeric value, is used as the first criterion.

Evaluation of both the time factor and the setup time ensures the best scheduling where the resource efficiency and the time factor are well balanced.

A scheduling system according to claim 14 is a scheduling system as claimed in claim 13, wherein the process selecting means calculates, base on the time relation among said plurality of processes, an evaluation value by generally evaluating the earliest processing time of each process as well as the correlation between the allocation status of each resource and each process that time and, based on the evaluation value, selects a process.

An invention according to claim 25 is a method for the invention as claimed in claim 14. That is, this is a scheduling method as claimed in claim 24, wherein the fourth step calculates, based on the time relation among the plurality of processes, an evaluation value by generally evaluating the earliest processing start time and the allowable latest processing time of each process as well as the correlation between the allocation status of each resource and each process at that time and, based on the evaluation value, selects a process.

According to the inventions as claimed in claims 14 and 25, an evaluation value is calculated, based on the time relation among a plurality of processes, by generally evaluating the earliest processing start time and the allowable latest processing time of each process as well as the correlation between the allocation status of each resource and each process at that time. This enables the user to select a high priority process with an earlier start time and end time while referring to the allocation status of each resource at that time.

A scheduling system according to claim 15 is a scheduling system as claimed in claim 14, wherein, when a process for which the same additional resources as the those defined for this process is allocated to a resource at that time, the process selecting means evaluates highly the correlation between the allocation status of resources and each process.

According to the invention as claimed in claim 15, a process with the same additional resource are defined as that of the process allocated to that resource at that moment is selected with priority.

A scheduling system according to claim 16 is a scheduling system as claimed in claim 14, wherein the process selecting means calculates the evaluation value using the earliest start time and the allowable latest end time.

According to the invention as claimed in claim 16, the operation becomes simple because the earliest start time is used as the earliest processing start time and because the latest end time is used as the allowable latest processing time.

A scheduling system according to claim 17 is a scheduling system as in one of claims 1 to 16, wherein the first evaluating means finds the first criterion by performing PERT (Program Evaluation and Review Technique) calculation.

An invention according to claim 26 is a method for the invention as claimed in claim 17. That is, this is a scheduling method as in one of claims 18 to 25, wherein the sixth step finds the first criterion by performing PERT (Program Evaluation and Review Technique) calculation.

According to the inventions as claimed in claims 17 and 26, the PERT calculation is executed to perform time evaluation each time a resource is allocated to a process. This eliminates the need for reallocation, thus reducing the scheduling time. More specifically, the PERT calculation is performed to evaluate the time. That is, the PERT calculation creates a process network representing the time relation such as the sequence or parallel relation of processes. And, when one or more processes are allocated to a resource or some period of time, the start times of other related processes or end times of other processes are obtained. Time data used in this invention may be calculated by any other method, with different names or different process forms, as long as the same type of calculation is performed.

Other and further objects, features and advantages of the invention will appear more fully from the following description.

SUMMARY OF THE INVENTION

Figure 1:
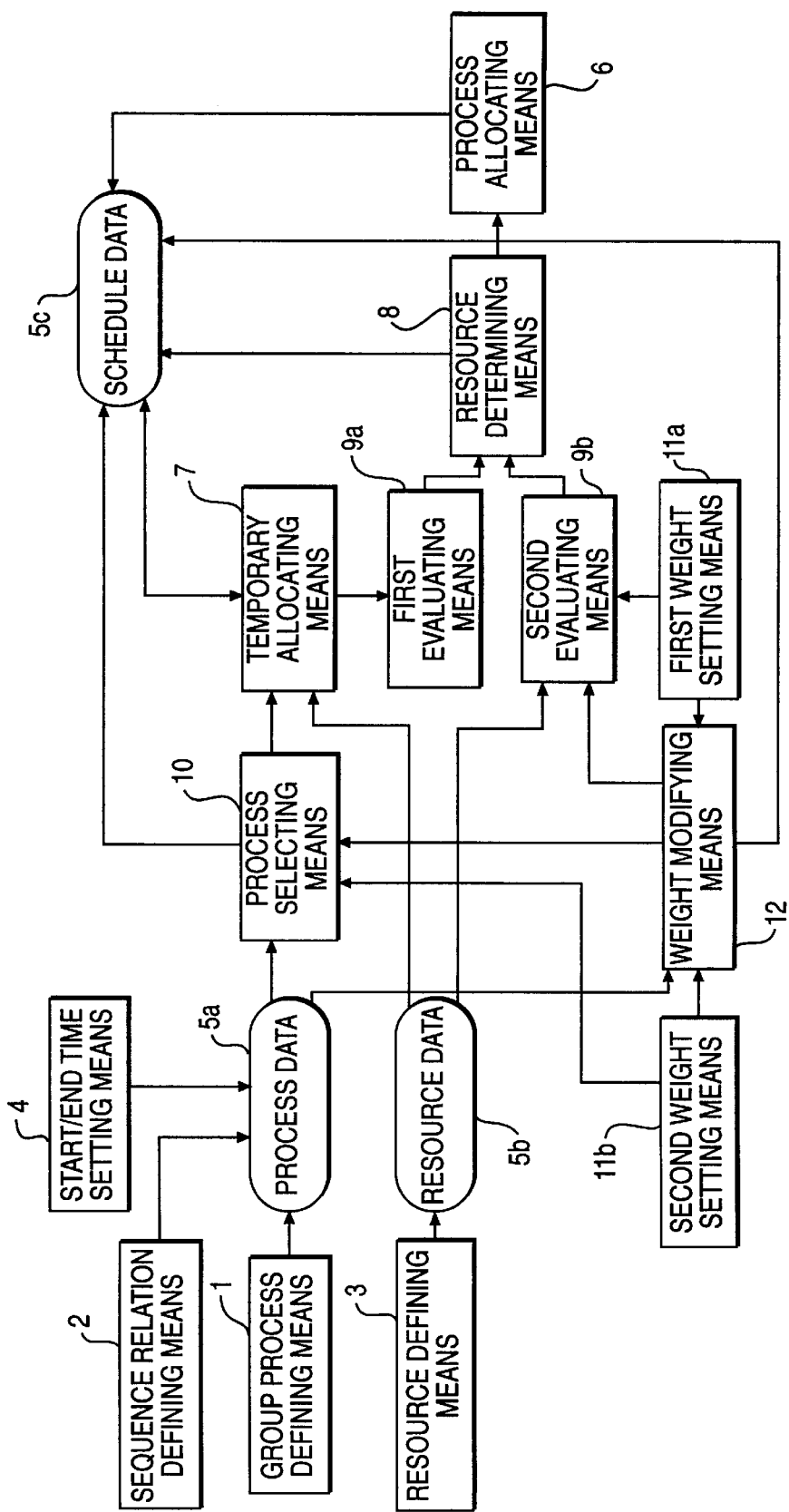
FIG. 1 is a functional block diagram showing the configuration of the scheduling system used in the first and second embodiments of this invention.

To achieve the above objects, one aspect of the present invention is a scheduling computer system for generating a schedule chart, the computer system comprising: resource defining means for inputting the attribute, such as an ability, of each of a plurality of resources; process defining means for inputting the attribute of each of a plurality of processes which are processed in a predefined sequence; time setting means for inputting the processing startable time and desired processing end time of said plurality of processes; process selecting means for sequentially selecting a process, to which a resource is to be allocated, from said plurality of processes; temporary allocating means for temporarily allocating each of said plurality of resources to a process selected by said process selecting means; first evaluating means for evaluating the end time of a sequence of processes with respect to the desired end time of said desired processing end time of the corresponding sequence of processes, set by said time setting means, by finding the end time of the sequence of said plurality of processes after said temporary allocation and for defining a resulting time evaluation value as the first criterion; second evaluating means for evaluating the fitness of a resource for a process based on the attribute of the resource inputted by said resource defining means and on the attribute of the process inputted by said process defining means and for defining a resulting fitness evaluation value as the second criterion; resource determining means for calculating a general evaluation value for the combination of a process and a resource by evaluating generally said first criterion and second criterion for each of said plurality of resources and for determining the optimum resource for the process by comparing said general evaluation values of all the resources; process allocating means for sequentially allocating a resource determined by said resource determining means to a process selected by said process selecting means as a final result; and means for generating a scheduling chart illustrating the process to which the resources have been allocated by the process allocating means, wherein said process selecting means does not select processes to which resources have been already allocated by said process allocating means as objects of said temporary allocation, and said first evaluating means respects said processes to which resources have been already allocated by said process allocating means when evaluating time.

Another aspect of the present invention is a computer-implemented scheduling method for generating a scheduling chart, comprising: a first step for inputting the attribute, such as an ability, of each of a plurality of resources; a second step for inputting the attribute of each of a plurality of processes which are processed in a predefined sequence; a third step for inputting the processing startable time and desired processing end time of said plurality of processes; a fourth step for sequentially selecting a process, to which a resource is to be allocated, from said plurality of processes; a fifth step for temporarily allocating each of said plurality of resources to a process selected in said fourth step; a sixth step for evaluating the end time of a sequence of processes with respect to the desired end time of said desired processing end time of the corresponding sequence of processes, set by said third step, by finding the end time of the sequence of said plurality of processes after said temporary allocation and for defining a resulting time evaluation value as the first criterion; a seventh step for evaluating the fitness of a resource for a process based on the attribute of the resource inputted in said first step and on the attribute of the process inputted in said second step and for defining a resulting fitness evaluation value as the second criterion; an eighth step for calculating a general evaluation value for the combination of a process and a resource by evaluating generally said first criterion and second criterion for each of said plurality of resources and for determining the optimum resource for the process by comparing said general evaluation values of all the resources; a ninth step for sequentially allocating a resource determined in said eighth step to a process selected in said fourth step as a final result; and a tenth step for generating a scheduling chart illustrating the processes to which the resources have been allocated, wherein, in said fourth step, processes to which resources have been already allocated in said ninth step are not selected, and, in said seventh step, said processes to which resources have been already allocated in said ninth step are also respected when evaluating time.

According to the invention, any of a plurality of processes is allocated to each of alternative resources during scheduling. In this case, it is assumed that each combination of a process and a resource has its own level of fitness. More specifically, this level of fitness determines at what process each resource is good or how well each process is processed by each resource. Various factors such as efficiency depend on a process to which each resource is allocated. On the other hand, allocation based only on the fitness may cause a tardy schedule.

To solve this problem, this invention temporarily allocates a resource to each process and finds the end time of each subsequent process, especially the end time of a sequence of consecutive processes, to evaluate the desired processing end time. This time evaluation represented as a numeric value, is used as the first criterion, and the fitness, represented as a numeric value, is used as the second criterion. The invention evaluates first criterion and the second criterion to determine the best combination of processes and resources.

Evaluating the fitness of each process for each resource while considering the time factor allows the user to make a schedule that well balances the fitness and the time factor.

DETAILED DESCRIPTION

A. First Embodiment (A-1) Configuration of the First Embodiment

FIG. 1 is a block diagram showing the configuration of the scheduling system according to the first embodiment of this invention. In this figure, the process defining means 1 groups a plurality of processes into some process groups and, for each process group, defines attributes of the process; those attributes include information such as a standard work time and resource preferences. The sequence relation defining means 2 defines the sequence relation of the processes. The sequence relation defining means 2 may be any method capable of defining the sequence relation of the processes; for example, it may use a graphical user interface.

The resource defining means 3 defines a plurality of resources and, for each resource, defines its attributes such as the capabilities of the resource in relation to a process. The start/end time setting means 4 sets the earliest possible start time and the desired end time for a group of processes defined by the process defining means 1 described above. The contents defined by the process defining means 1 and the sequence relation defining means 2 as well as the contents set up by the start/end time setting means 4 are stored in the process data 5a, and the contents defined by the resource defining means 3 are stored in the resource data 5b.

The process selecting means 10 performs the PERT calculation to select higher-priority processes defined by the process defining means 1. The temporary allocating means 7 performs PERT calculation to temporarily allocate to each process the resource selected by the process selecting means 10.

The first evaluating means 9a evaluates allocation times based on the PERT calculation performed by the temporary allocating means 7. The second evaluating means 9b evaluates selected resources. And, based on the evaluation of the first evaluating means 9a and that of the second evaluating means 9b, the resource determining means 8 evaluates the combination of each process, selected by the process selecting means 10, and each resource, and selects the resource that is best for the process.

The process allocating means 6 allocates the resources, determined by the resource determining means 8, to each of a plurality of processes.

The first weight setting means 11a sets the first weight when the second evaluating means 9b performs evaluation. The second weight setting means 11b sets the second weight when the process selecting means 10 selects a process. The weight modifying means 12 modifies the first and second weights according to various conditions such as specific relations of processes, the maximum allowable delays, or some failing resources.

(A-2) Operation of the First Embodiment (1) How is a project scheduled in the first embodiment?

The following explains an example of project scheduling using a scheduling system with the configuration described above.

In the following discussion, the design project of a video cassette recorder is used as an example of project scheduling problem. In this embodiment, a project is scheduled by allocating resources which are workers (in this example, designers) to processes. They are responsible for designing two types of video cassette recorder, each of which has its own schedule. That is, the designer team is responsible for designing two types of model, each with its own project start date and desired project end date. The design of each model consists of a plurality of design items, each of which consists of a plurality of processes. And, a chief designer is assigned to each design item. Under this condition, this problem determines the designers and work days for all the processes.

The scheduling of this project is evaluated based on the following two criteria:

1. The chief designer responsible for each design item should work as much time on the design item as possible.
2. The project should be scheduled so that the desired project end date requirements are satisfied as much as possible.

That is, the scheduling problem in this embodiment requires that a schedule be made while well balancing the above two evaluation criteria.

(2) Entering scheduling targets and associated data

The user enters data on a plurality of processes, which are scheduling targets, and on a plurality of resources as follows:

First, the user uses the process defining means 1, the sequence relation defining means 2, and the resource defining means 3, which are shown in FIG. 1, to enter data on the processes, sequence relation, available resources, and standard manpower. The sequence relation of processes may be calculated within the system using data defined by the process defining means 1 or some other data.

Basically, each model consists of three components: mechanical part (1), circuit part (2), and cabinet (3). The mechanical part, in turn, consists of the loading mechanism (1-1), head (1-2), and winder (1-3); the circuit part consists of the mechanical part driver (2-1), image signal processor (2-2), and power supply (2-3); and the cabinet consists of the cabinet itself (3-1). Each of these items is designed, in most cases, in four processes: concept design (1), specifications preparation (2), internal design (3), and parts diagram preparation (4).

First, the user uses the process defining means 1 to enter the standard number of days for each of the above processes. As a result, the standard manpower table, shown in Table 1, is created.

TABLE 1

| ID | Item name | Concept design | Specification preparation | Internal design | Parts diagram preparation |
|---|---|---|---|---|---|
| 11 | Mechanical part | | | | |
| 11-1 | Loading mechanism | 8 | 6 | 21 | 6 |
| 11-2 | Head | 4 | 8 | 21 | 4 |
| 11-3 | Winder | 6 | 6 | 21 | 4 |
| 12 | Circuit part | | | | |
| 12-1 | Mechanical part driver | 8 | 10 | 25 | 6 |
| 12-2 | Image signal processor | 6 | 10 | 10 | 4 |
| 12-3 | Power supply | 6 | 6 | 10 | 4 |
| 13 | Cabinet | | | | |
| 13-1 | Cabinet | 4 | 4 | 6 | 4 |

In this embodiment, each process is identified by the ID and process sequence numbers separated by a hyphen, as shown in Table 1. Two models, model 1 and model 2, are identified by the number in the tens position of ID. For example, the concept design process of the loading mechanism of the mechanical part of model 1 is represented as "11-1-1", and the specification process of the winder of the mechanical part of model 2 is represented as "21-3-2". In this embodiment, this standard manpower table is used also for model 2, assuming that the contents of, and the manpower required for, each process for model 1 are the same as those for model 2. The standard manpower table, shown in Table 1, is stored in the process data 5a as data A.

A chief designer is assigned to each major item (mechanical part, circuit part, and cabinet) of each model. There are six designers, "A" to "F", and major items are assigned to three of them, "A" to "C". The user uses the process defining means 1 to enter this chief designer data in the tabular form, as shown in Table 2.

TABLE 2

| ID | Item name | Chief designer |
|---|---|---|
| 1 | Mechanical part | A |
| 2 | Circuit part | B |
| 3 | Cabinet | C |

This chief designer data is stored in the process data 5a as data B.

Each process is done in the following order: 1. concept design, 2. specification preparation, 3. internal design, and 4.

parts diagram preparation. This sequence relation is set up by referring to data A shown in Table 1. In addition, there are the following restrictions on the design sequence:
a) The concept design of the mechanical part driver starts after the concept design of the mechanical part ends.
b) The concept design of the power supply starts after the specifications for the mechanical part driver and the image signal processor are prepared.
c) The concept design of the cabinet starts after the internal design of the mechanical part and the circuit part ends.

The user uses the sequence relation defining means 2 to enter the relation described in a) to c) above. In this embodiment, the sequence relation of processes is defined in tabular form as shown in Table 3.

TABLE 3

| Predecessor process | Successor process | Predecessor process | Successor process |
|---|---|---|---|
| 11-1-1 | 12-1-1 | 21-1-1 | 22-1-1 |
| 11-2-1 | 12-1-1 | 22-1-1 | 22-1-1 |
| 11-3-1 | 12-1-1 | 21-1-1 | 22-1-1 |
| 12-1-2 | 12-3-1 | 21-1-1 | 22-1-1 |
| 12-2-2 | 12-3-1 | 22-2-2 | 22-3-1 |
| 11-1-3 | 13-1-1 | 21-1-3 | 23-1-1 |
| 11-2-3 | 13-1-1 | 21-2-3 | 23-1-1 |
| 11-3-3 | 13-1-1 | 21-3-3 | 23-1-1 |
| 12-1-3 | 13-1-1 | 22-1-3 | 23-1-1 |
| 12-2-3 | 13-1-1 | 22-2-3 | 23-1-1 |
| 12-2-3 | 13-1-1 | 22-2-3 | 23-1-1 |

The sequence relation table shown in Table 3 is stored in the process data 5a as data C.

For each major item and for each process of a major item, the user uses the resource defining means 3 to enter data on the ability of each designer. This data indicates whether or not a designer can do each process of a major item and, if he can, how much ability he has. This data is entered in tabular form as shown in Table 4.

TABLE 4

| Designer name | Concept design | Specification preparation | Internal design | Parts diagram preparation |
|---|---|---|---|---|
| Mechanical part/Cabinet (mechanical design) | | | | |
| A | 1.0 | 1.0 | 1.0 | 1.0 |
| B | 1.0 | 1.0 | 1.0 | 1.0 |
| C | 1.0 | 1.0 | 1.0 | 1.0 |
| D | x | 1.0 | 1.0 | 1.0 |
| E | x | x | x | x |
| F | x | 0.8 | 0.8 | 0.8 |
| Circuit part (electrical design) | | | | |
| A | 1.0 | 1.0 | 1.0 | 1.0 |
| B | 1.0 | 1.0 | 1.0 | 1.0 |
| C | 1.0 | 1.0 | 1.0 | 1.0 |
| D | x | x | x | x |
| E | x | 1.0 | 1.0 | 1.0 |
| F | x | 0.8 | 0.8 | 0.8 |

Table 4 indicates that "D", "E", and "F" are outside designers and that they cannot do the concept design. The table indicates that the outside designer "D" cannot do the electrical design job and that the outside designer "E" can do only the electrical design job. It also indicates that "D" and "E" have the standard ability and that "F" has 0.8 times the standard ability. The value of 0.8 specified for "F" affects the work time; for example, it takes 10 days for "F" to do a job whose standard work time is 8 days. The ability defining table, shown in Table 4, is stored in the resource data 5b as data D.

The user uses the resource defining means 3 to enter the holidays of each designer. In this embodiment, it is assumed that Saturday and Sunday are holidays and that, for simplicity, there is no special holidays. The schedule time starts on Mar. 28, 1994 and, according to the design of this system, time data is treated as integral values on a daily basis with midnight on March 28 as being 0. Therefore, a job which starts on April 1 and ends on April 2 actually ends by midnight on April 2. In this case, the work time is only 1 day (April 1).

In addition, the user uses the start/end time setting means 4 to enter the earliest start date and the desired end date of each model, as shown in Table 5.

TABLE 5

| Medel | Earliest start date | Desired end date |
|---|---|---|
| 1 | 1994/4/1 | 1994/7/1 |
| 2 | 1994/6/1 | 1994/10/1 |

The start/end date setup table, shown in Table 5, is stored in the process data 5a as data E.

In addition to various types of data described above, the schedule data 5c also includes data F, shown in Table 6, for use in internal calculation for scheduling.

TABLE 6

| ID name | EST | EET | LST | LET | RS | START | END |
|---|---|---|---|---|---|---|---|
| 11-1-1 | 3/28 | 3/28 | 3/28 | 3/28 | NONE | — | — |
| 11-1-2 | 3/28 | 3/28 | 3/28 | 3/28 | NONE | — | — |
| 11-1-3 | 3/28 | 3/28 | 3/28 | 3/28 | NONE | — | — |
| 11-1-4 | 3/28 | 3/28 | 3/28 | 3/28 | NONE | — | — |
| 11-2-1 | 3/28 | 3/28 | 3/28 | 3/28 | NONE | — | — |
| . | | | | | | | |
| . | | | | | | | |
| 22-3-4 | 3/28 | 3/28 | 3/28 | 3/28 | NONE | — | — |
| 23-1-1 | 3/28 | 3/28 | 3/28 | 3/28 | NONE | — | — |
| 23-1-2 | 3/28 | 3/28 | 3/28 | 3/28 | NONE | — | — |
| 23-1-3 | 3/28 | 3/28 | 3/28 | 3/28 | NONE | — | — |
| 23-1-4 | 3/28 | 3/28 | 3/28 | 3/28 | NONE | — | — |
| Model 1 | 3/28 | 3/28 | 3/28 | 3/28 | — | — | — |
| Model 2 | 3/28 | 3/28 | 3/28 | 3/28 | — | — | — |

At the start of scheduling, the standard manpower table, which is stored as data A, is expanded into data F. In table 6, the column "RS" contains resource data, and "NONE" in that column means that the resource is not yet allocated. The date 3/28, the start time of the above-described schedule time, is set as the initial value. The columns "EST", "EET", "LST", and "LET" contain the results of PERT calculation, meaning the earliest start time, earliest end time, latest start time, and latest end time, respectively. In the PERT calculation, this embodiment uses the standard manpower time as the work time. The column "START" contains the start time of actual allocation, and the column "END" contains the end time of actual allocation.

(3) Estimating an allowable delay amount

Scheduling starts after data is set up as described above. The following explains, with the use of a flowchart in FIG. 2, how scheduling system works. The explanation begins with the estimate of an allowable delay amount.

Figure 3:
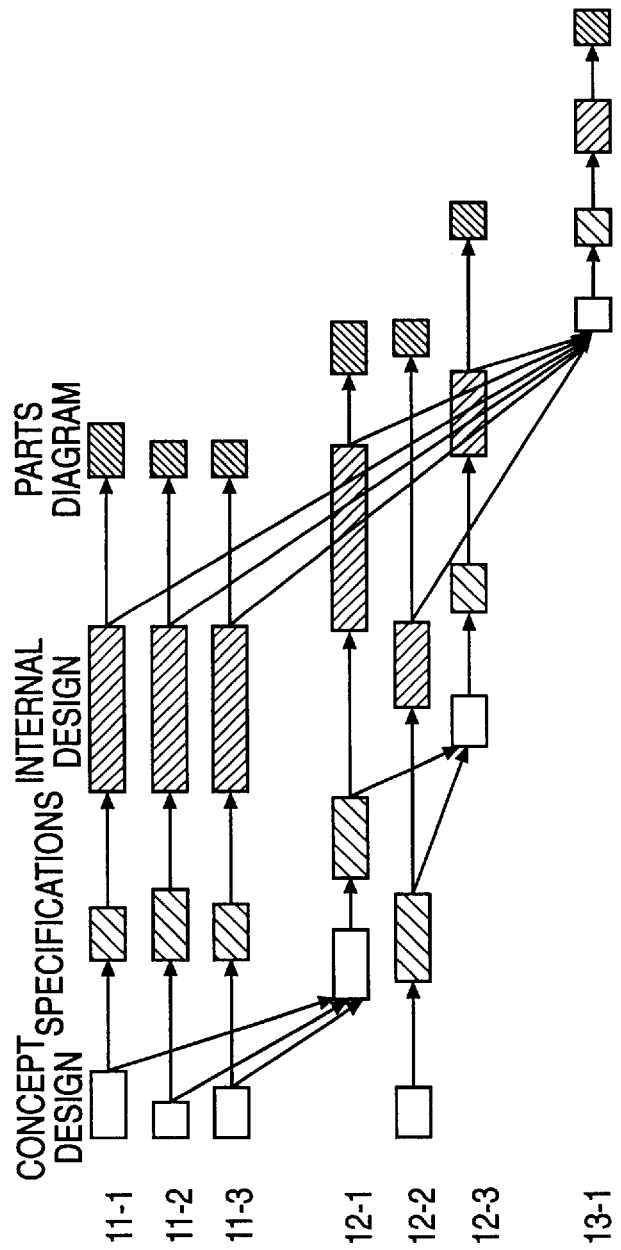
FIG. 3 is a diagram showing, in a network form, the sequence relation of the processes used in the first embodiment of this invention.
Figure 4:
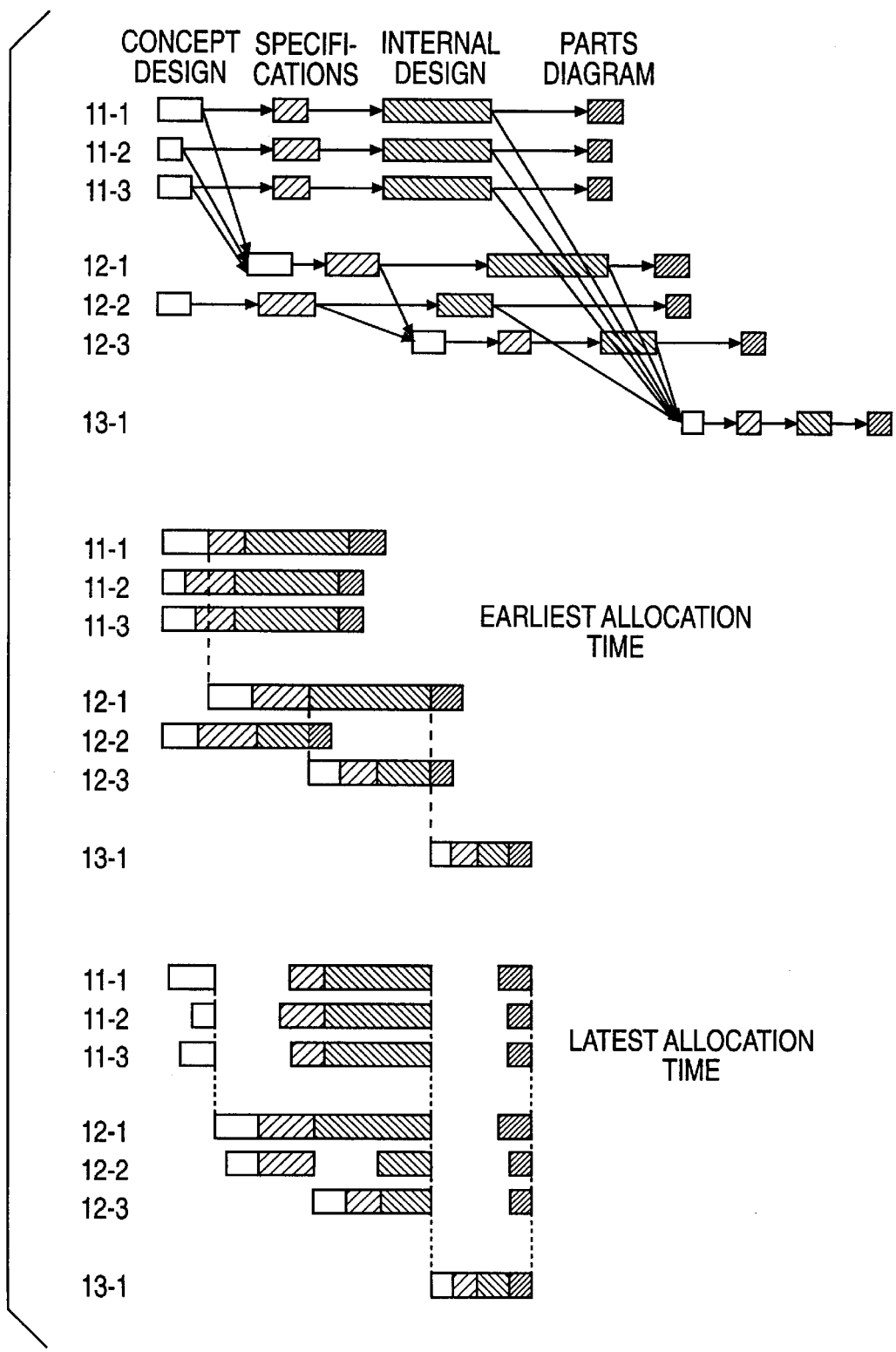
FIG. 4 is a diagram showing the result of the PERT calculation based on the sequence relation of the processes used in the first embodiment of this invention.

In step S1, the weight modifying means 12 performs the PERT calculation based on the sequence relation defined by the sequence relation defining means 2. FIG. 3 shows, in a network form, the sequence relation of data C stored in Table 3. FIG. 4 shows the result of the PERT calculation, based on this sequence relation, with the start time of the concept design of each model as 0. The "earliest allocation time" in FIG. 4 indicates the earliest time at which processing may be started or ended for each process, while the "latest allocation time" indicates the latest time before which processing must be started or ended for all the processes of the model to have completed at the time of the deadline which is the "earliest allocation time" of the last process. Therefore, if we don't have to worry about the number of designers and chief designers, we will be able to complete this project within 69 days. In other words, it takes at least 69 days to complete this project.

The result of the PERT calculation is stored as data F, as shown in Table 7.

TABLE 7

| ID name | EST | EET | LST | LET | RS | START | END |
|---------|-----|-----|-----|-----|------|-------|-----|
| 11-1-1  | 4/1 | 4/9 | 4/23 | 5/1 | NONE | — | — |
| 11-1-2  | 4/9 | 4/15 | 5/17 | 5/23 | NONE | — | — |
| 11-1-3  | 4/15 | 5/6 | 5/23 | 6/13 | NONE | — | — |
| 11-1-4  | 5/6 | 5/12 | 6/25 | 7/1 | NONE | — | — |
| 11-2-1  | 4/1 | 4/5 | 4/27 | 5/1 | NONE | — | — |
| .       |     |     |     |     |      |   |   |
| .       |     |     |     |     |      |   |   |
| .       |     |     |     |     |      |   |   |
| 22-3-4  | 7/19 | 7/23 | 9/27 | 10/1 | NONE | — | — |
| 23-1-1  | 7/22 | 7/26 | 9/13 | 9/17 | NONE | — | — |
| 23-1-2  | 7/26 | 7/30 | 9/17 | 9/21 | NONE | — | — |
| 23-1-3  | 7/30 | 8/5 | 9/21 | 9/27 | NONE | — | — |
| 23-1-4  | 8/5 | 8/9 | 9/27 | 10/1 | NONE | — | — |
| Model 1 | 4/1 | 6/9 | 4/23 | 7/1 | — | — | — |
| Model 2 | 6/1 | 8/9 | 7/24 | 10/1 | — | — | — |

EST (earliest start time) column and the LST (latest start time) column for model 1 and model 2 in the above table contain the start time for the model itself, and the EET (earliest end time) column and the LET (latest end time) column contain the end time for the model itself. For an already-allocated process, the PERT calculation is performed with the allocated start time, earliest start time (EST), and latest start time (LST) set equal, and with the allocated end time, earliest end time (EET), and latest end time (LET) set equal.

After the PERT calculation ends, the weight modifying means 12 estimates an allowable delay amount for each model. An allowable delay amount, which is a weight for a chief designer at allocation time, is a delay amount allowable for the chief designer in each allocation. This allowable delay amount is obtained from the result of the PERT calculation described above. That is, the number of spare days for each process allocation is calculated by dividing the number of spare days for a model (difference between the latest end time LET and the earliest end time EET) by the number of unallocated processes (number of all processes). The following is a formula for finding the allowable delay amount Dn for each process of model n:

$$Dn = \frac{(LET - EET) \times \alpha}{\text{Number of unallocated processes}}$$

where α is a coefficient for adjusting the latest end time of each model to the desired end time; this varies according to how the process network is formed. More specifically, if the process network is serial with an equal delay in all the jobs, the coefficient α becomes closer to 1. However, for a project where there are many parallel processes as in this embodiment, the delay amounts are not likely to be equal. This is because a delay in one process delays the subsequent processes but increases the number of spare days for the parallel processes and therefore those processes are more likely to be scheduled without delay. As a result, their scheduled end time is earlier than the desired end time. The value of α must be adjusted according to how the process network is formed for each model. For convenience, it is assumed that α=10 in this embodiment.

The weight base value α is specified by the first weight setting means 11a. Thus, the allocable delay amounts D1 and D2 for models 1 and 2 are obtained by the following formula:

$$D1 = \frac{(1/7 - 6/9) \times 10}{28} = \frac{22 \times 10}{28} = 7.86$$

$$D2 = \frac{(10/1 - 8/9) \times 10}{28} = \frac{53 \times 10}{28} = 18.93$$

(4) Process selection

Next, the system sequentially selects processes to be allocated to designers. That is, in step S2, the system determines whether there are processes to be allocated and, if there are such processes, passes control to step S3. In step S3, the process selecting means 10 performs the PERT calculation. For an already-allocated process, the process selecting means 10 performs only the PERT calculation for the earliest time, assuming that the allocated start time and the earliest start time (EST) are equal and that the allocated end time and the earliest end time (EET) are equal. The result of this calculation is written into the data F in the schedule data 5c. During the first scheduling, the result obtained in the above calculation is equal to the result obtained in step S1.

In step 4, the process selecting means 10 selects one of high-priority processes. In this embodiment, a priority is defined as "earliest start time EST+(latest end time LET−earliest start time EST)×θ". In this embodiment, θ is fixed to 0.5. The value of θ may be some other value. The process selecting means 10 references data F in Table 7 to select the earliest start time EST and the latest end time LET; if there are a plurality of times that have the same value, it selects the one with the smallest sequence number. In this case, it selects the process "11-1-1".

Instead of selecting a process according to the priority only, a process may also be selected by evaluating the correlation between the allocation status of each designer and each process. For example, by changing the value of θ, the priority may be adjusted as described below. That is, the value of θ, which is now variable, may be specified for each process so that the value of θ for a process whose chief designer has the longest vacant time at a particular moment becomes smaller. This causes a process with a smaller value of θ to be selected with priority. As a result, the chief designer is more likely to be allocated to this process compared with other processes with the same work time. In this case, the second weight setting means 11b is used to set a weight, which increases the priority of the above process.

For example, let the vacant time of each resource (r) be T(r), the chief designer of each process i be Ri, and the second weight be m (0<m<1). θ i of each process is as follows:

$$\theta i = (0.5 - m/2) + m * \{T(Ri) - \min(T(r))\} / \{\max(T(r)) - \min(T(r))\}$$

In this case, the value of θ i is in the range "0.5"+m.

As described above, a process evaluation value generated using the value of θ i (that is, a selection base value), expressed in time values, is always in the range from the earliest start time EST to the latest end time LET.

A process selected here is always allocated between the earliest start time EST and the latest end time LET. So, if the selection base value is largely outside this range, some problems may arise. That is, there is a possibility that a process which should be processed later is selected before a process that can be processed earlier. In many cases, this will involve a waste in allocation; for example, an unwanted vacant time is created or a lower-priority process is largely delayed.

To avoid these problems, a priority may be assigned to an evaluation value.

(5) Temporary allocation

Next, the system temporarily allocates a selected process to a designer. In step S5, the temporary allocating means 7 selects one of designers, "A" to "F", defined by the resource defining means 3. In this embodiment, they are selected in the order "F" to "A", although they may be selected in any order. In step S6, the temporary allocating means 7 checks if all the designers were allocated to the process, and if there is one or more unallocated designers, control is passed to step S7. In this example, the temporary allocating means 7 selects the designer "F" first.

In step S7, the temporary allocating means 7 references data D stored in Table 4 (ability defining table) to check if the selected resource may be allocated to the process selected in step S4. Because the process "11-1-1" is the concept design of the mechanical part, the temporary allocating means 7 determines that the designer "F" cannot be allocated to the process, and returns control to step S5. In this case, a list of resources that can be allocated to each process, if prepared previously, combines step S5 through step S7 into one step. This list allows the temporary allocating means 7 to determine if a process may be allocated to a resource without having to repeat steps S5 and S6.

Similarly, in step S5, the temporary allocating means 7 selects "E" and "D" sequentially, and determines that the process cannot be allocated to them. When the temporary allocating means 7 selects "C", it references data D (ability defining table) in Table 4 in step 6 to find that the process may be allocated to "C", and passes control to step S8.

Then, in step S8, the temporary allocating means 7 references data A (standard manpower table) in Table 1 and finds that the standard manpower required for the process is 8 days. It also references data D (ability defining table) in Table 4 to find how long the designer will take to do this process (work time). Because the ability defining table indicates that the ability of the designer "C" to do the concept design of the mechanical part is 1.0, the work time is calculated as follows:

Standard work time(8 days)/Ability definition(1.0)=8 days

Note that a list of designers and their work time required for each design item may be prepared in advance. This list, if prepared, eliminates the need to do this calculation at this time.

In step S9, the resource determining means 7 references data F in Table 7 to find a period of time during which the work time may be allocated for the resource. Here, it finds a period of time during which designer "C" can be allocated for 8 consecutive days without any other intervening work time. If no process is not yet allocated to "C", the resource determining means 8 finds a time starting on 4/1 and ending on 4/13 (midnight) with two weekends in between. It then performs the PERT calculation to obtain an evaluation value that is used when the process "11-1-1" is allocated to designer "C".

Before performing the PERT calculation, the temporary allocating means 7 temporarily copies data F in Table 7 to another area, sets the earliest start time EST and the latest start time LST of "11-1-1" to 4/1, and sets the earliest end time EET and the latest end time LET to 4/13 (hereafter called temporary allocation). And, during PERT calculation, the temporary allocating means 7 retries the calculation of the only earliest start time EST and the earliest end time EET. As a result, data is as changed shown in Table 8.

TABLE 8

| ID name | EST | EET | LST | LET | RS | START | END |
|---------|-----|-----|-----|-----|-----|-------|-----|
| 11-1-1 | 4/1 | 4/13 | 4/23 | 5/1 | NONE | — | — |
| 11-1-2 | 4/13 | 4/19 | 5/17 | 5/23 | NONE | — | — |
| 11-1-3 | 4/19 | 5/10 | 5/23 | 6/13 | NONE | — | — |
| 11-1-4 | 5/10 | 5/16 | 6/25 | 7/1 | NONE | — | — |
| 11-2-1 | 4/1 | 4/5 | 4/27 | 5/1 | NONE | — | — |
| . | | | | | | | |
| . | | | | | | | |
| . | | | | | | | |
| 22-3-4 | 7/19 | 7/23 | 9/27 | 10/1 | NONE | — | — |
| 23-1-1 | 7/22 | 7/26 | 9/13 | 9/17 | NONE | — | — |
| 23-1-2 | 7/26 | 7/30 | 9/17 | 9/21 | NONE | — | — |
| 23-1-3 | 7/30 | 8/5 | 9/21 | 9/27 | NONE | — | — |
| 23-1-4 | 8/5 | 8/9 | 9/27 | 10/1 | NONE | — | — |
| Model 1 | 4/1 | 6/13 | 4/1 | 7/1 | — | — | — |
| Model 2 | 6/1 | 8/9 | 7/24 | 10/1 | — | — | — |

(6) Finding the evaluation value of the combination

Then, the system finds an evaluation value when the designer is allocated to the process. The evaluation value V is calculated by subtracting the fitness evaluation value for resource selection (Vr) from the time evaluation value for the allocation time (Vd). The smaller the value, the better the evaluation.

The first evaluating means 9a calculates the time evaluation value for the allocation time (Vd) based on the above PERT calculation. The delay (S) in the work time of the model itself caused when the designer is allocated to the process (after temporary allocation) is calculated using the following formula:

$$Dn = \begin{cases} EET \text{ of the model after temporary allocation } - \\ EET \text{ of the model before temporary allocation} \quad (> 0) \\ 0 \quad \text{(otherwise)} \end{cases}$$

Because the earliest end time EET of the model after temporary allocation is 6/13 and the earliest end time EET of the model before temporary allocation is 6/9, the delay in the work time of the model is calculated as follows:

$$S = 6/13 - 6/9 = 4$$

The time evaluation value Vd is calculated by the following formula:

$$Vd = S + \frac{T}{2}$$

where, T is the number of days from the schedule start time (3/28 in this example) to the end time of the temporary allocation of the process. Therefore, the time evaluation value Vd is calculated by the following formula:

$$Vd = 4 + \frac{12}{2} = 12$$

Then, the first evaluating means 9b finds the fitness evaluation value for resource selection Vr. This fitness evaluation value Vr is set as follows:

$$Vr = \begin{cases} D1 & \text{(The allocation resource is the chief designer)} \\ 0 & \text{(The allocation resource is not the chief designer)} \end{cases}$$

Because the chief designer of the process "11-1-1" is "A", Vr=0.

The resource determining means 8 finds the evaluation value V using the time evaluation value Vd, calculated by the first evaluating means 9, and the fitness evaluation value Vr calculated by the second evaluating means 9b. In the above example, the evaluation value V obtained by combining the process "11-1-1" and the designer "C" is calculated as follows:

$$V=12-0=12$$

(7) Determining the best designer

Next, the system determines the best designer.

In step S10, the resource determining means 8 checks if the evaluation value V obtained as described above is best and, if it is best, stores it. In the above example, because the evaluation value V (12) is best for the process "11-1-1" the resource determining means 8 stores this evaluation value V and the designer "C" in the schedule data 5c.

(8) Evaluation of other designers

Then, the system finds the evaluation value V of other designers in the similar way.

That is, control goes back to step S5, and the evaluation value for the next designer B is calculated similarly in steps S5 to S10. Because the end time (4/13) is the same as when the designer "C" was temporarily allocated to the process and because neither "C" nor "D" is the chief designer, the evaluation value V is 12. This is the same as that of "C" and, therefore, the best designer "B" is not updated.

Then, the system finds an evaluation value for the next designer A in steps S5 to S10. First, "A" is temporarily allocated to the process "11-1-1". Because the evaluation value for the allocation time Vd is the same but "A" is the chief designer, the evaluation value for resource selection Vr is D1 (that is, 7.86). Therefore, the evaluation value V for designer "A" is calculated as follows:

$$V=12-7.86=4.14$$

This means that the evaluation value V for "A" is better than that for "C". In step S10, this evaluation value V (4.14) and the best designer "A" are stored in the schedule data 5c.

After all the designers are evaluated, control goes to step S11.

(9) Allocating the process to the best designer

Finally, the system allocates the best designer to the process.

In step S11, the process allocating means 6 allocates to the process the designer stored in the schedule data 5c by the resource determining means 8. In the above example, the process "11-1-1" is allocated to the best designer "A". Data F in Table 9 looks like as shown below.

TABLE 9

| ID name | EST | EET | LST | LET | RS | START | END |
|---|---|---|---|---|---|---|---|
| 11-1-1 | 4/1 | 4/13 | 4/23 | 5/1 | A | 4/1 | 4/13 |
| 11-1-2 | 4/13 | 4/19 | 5/17 | 5/23 | NONE | — | — |
| 11-1-3 | 4/19 | 5/10 | 5/23 | 6/13 | NONE | — | — |
| 11-1-4 | 5/10 | 5/16 | 6/25 | 7/1 | NONE | — | — |
| 11-2-1 | 4/1 | 4/5 | 4/27 | 5/1 | NONE | — | — |
| . | | | | | | | |
| . | | | | | | | |

TABLE 9-continued

| ID name | EST | EET | LST | LET | RS | START | END |
|---|---|---|---|---|---|---|---|
| . | | | | | | | |
| 22-3-4 | 7/19 | 7/23 | 9/27 | 10/1 | NONE | — | — |
| 23-1-1 | 7/22 | 7/26 | 9/13 | 9/17 | NONE | — | — |
| 23-1-2 | 7/26 | 7/30 | 9/17 | 9/21 | NONE | — | — |
| 23-1-3 | 7/30 | 8/5 | 9/21 | 9/27 | NONE | — | — |
| 23-1-4 | 8/5 | 8/9 | 9/27 | 10/1 | NONE | — | — |
| Model 1 | 4/1 | 6/13 | 4/23 | 7/1 | — | — | — |
| Model 2 | 6/1 | 8/9 | 7/24 | 10/1 | — | — | — |

As shown above, "A" is set in the resource RS column for the process "11-1-1", and the earliest start time EST (4/1) and the earliest end time EET (4/13) are set in the start time START column and the end time END column, respectively.

The system repeats the above steps to create a schedule. As a designer is allocated to more processes, the start/end times of those processes vary according to the designer. So, the system evaluates a combination of a process and a designer by estimating the time required for the designer to do the process and by checking if the designer is the chief designer of the process. It then compares the resulting evaluation values. And, if the delay is in an allowable range, the system allocates the chief designer to the process; otherwise, the system allocates to the process a non-chief designer who can perform the process within the allowable time limit. After the system allocates all the processes, it finds, in step S2, that there is no more processes to be allocated and passes control to step S11 to terminate scheduling.

Table 10 shows data F generated as a result of scheduling.

TABLE 10

| ID name | EST | EET | LST | LET | RS | START | END |
|---|---|---|---|---|---|---|---|
| 11-1-1 | 4/1 | 4/13 | 4/23 | 5/1 | A | 4/1 | 4/13 |
| 11-1-2 | 4/13 | 4/21 | 5/17 | 5/23 | D | 4/13 | 4/21 |
| 11-1-3 | 5/3 | 6/1 | 5/23 | 6/13 | A | 5/3 | 6/1 |
| 11-1-4 | 6/7 | 6/15 | 6/25 | 7/1 | A | 6/7 | 6/15 |
| 11-2-1 | 4/1 | 4/7 | 4/27 | 5/1 | C | 4/1 | 4/7 |
| . | | | | | | | |
| . | | | | | | | |
| 22-3-4 | 10/4 | 10/8 | 9/27 | 10/1 | B | 10/4 | 10/8 |
| 23-1-1 | 9/20 | 9/24 | 9/13 | 9/17 | C | 9/20 | 9/24 |
| 23-1-2 | 9/26 | 9/30 | 9/17 | 9/21 | C | 9/26 | 9/30 |
| 23-1-3 | 9/30 | 10/8 | 9/21 | 9/27 | C | 9/30 | 10/8 |
| 23-1-4 | 10/10 | 10/14 | 9/27 | 10/1 | C | 10/10 | 10/14 |
| Model 1 | 4/1 | 7/8 | 4/23 | 7/1 | — | — | — |
| Model 2 | 6/1 | 10/14 | 7/24 | 10/1 | — | — | — |

Figure 5:
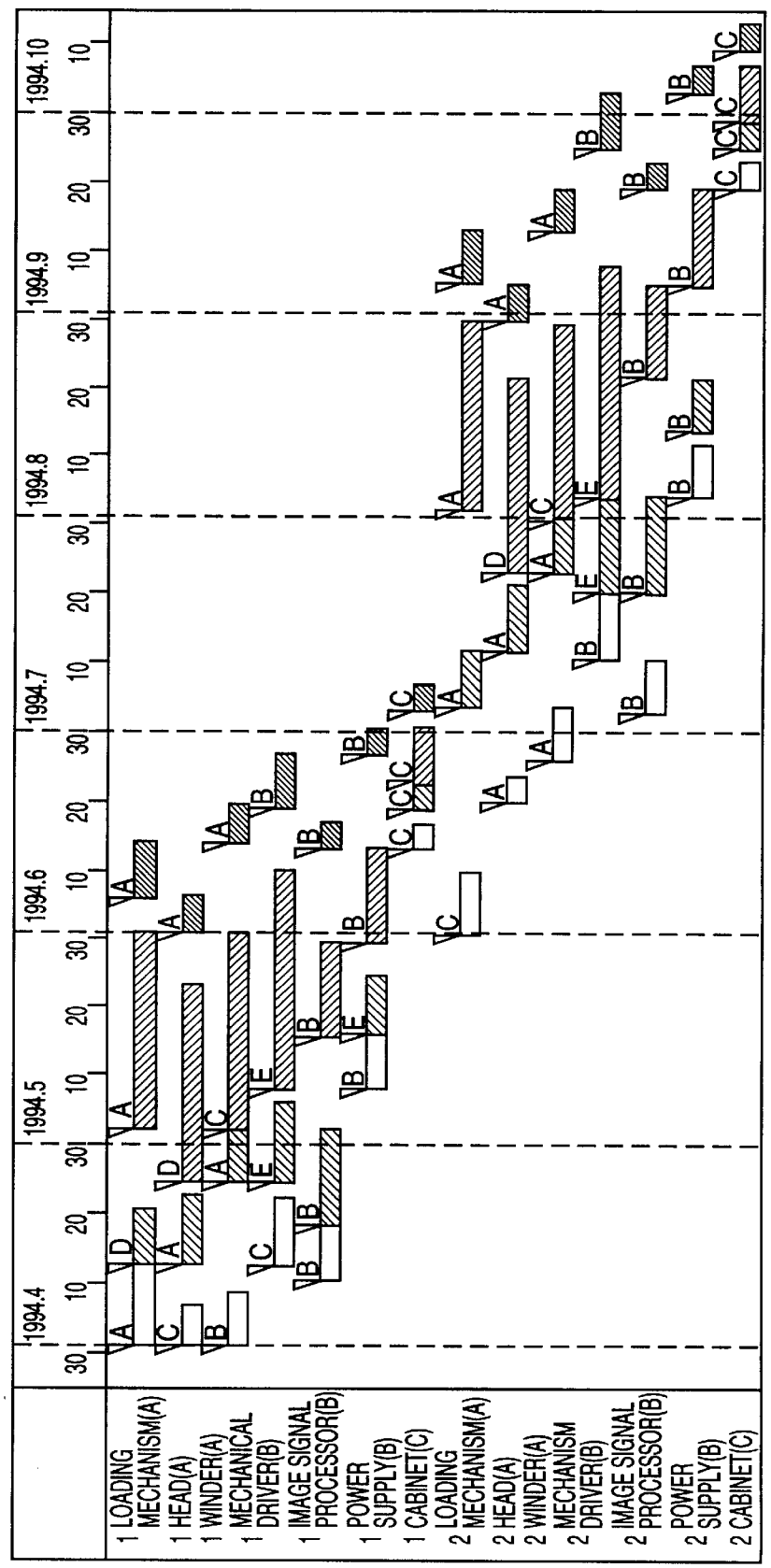
FIG. 5 is a Gantt chart showing the result of scheduling in the first embodiment of this invention, which shows the schedule for each design item.
Figure 6:
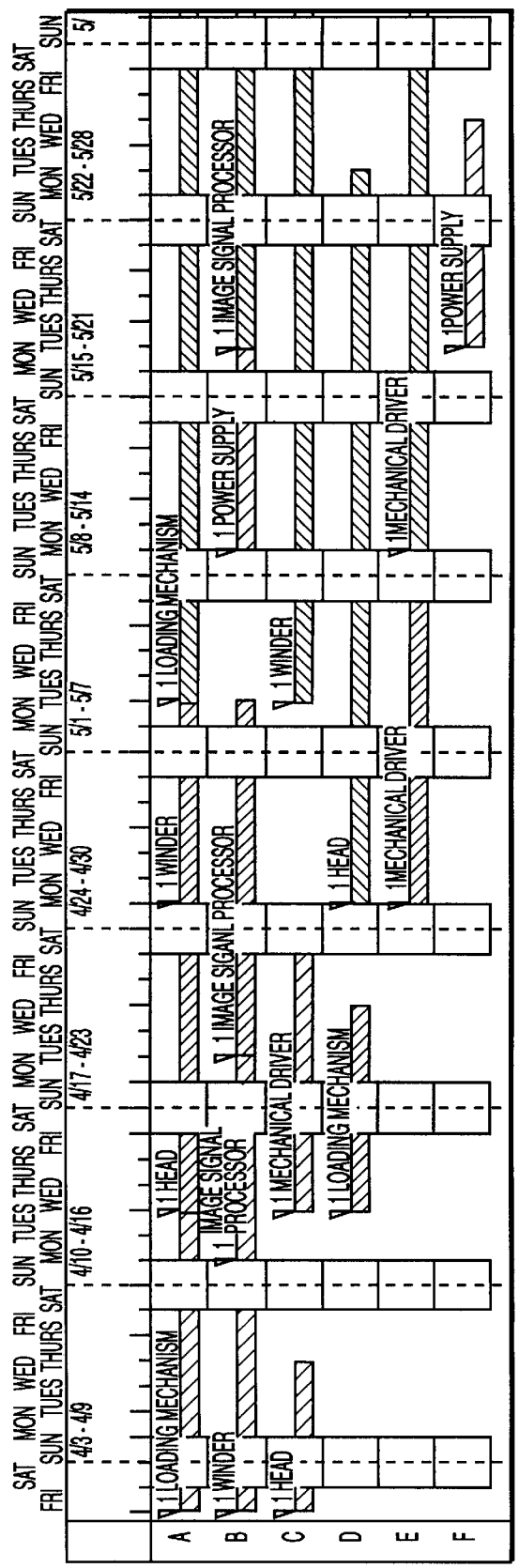
FIG. 6 is a Gantt chart showing the result of scheduling in the first embodiment of this invention, which shows the schedule for each designer.
Figure 7:
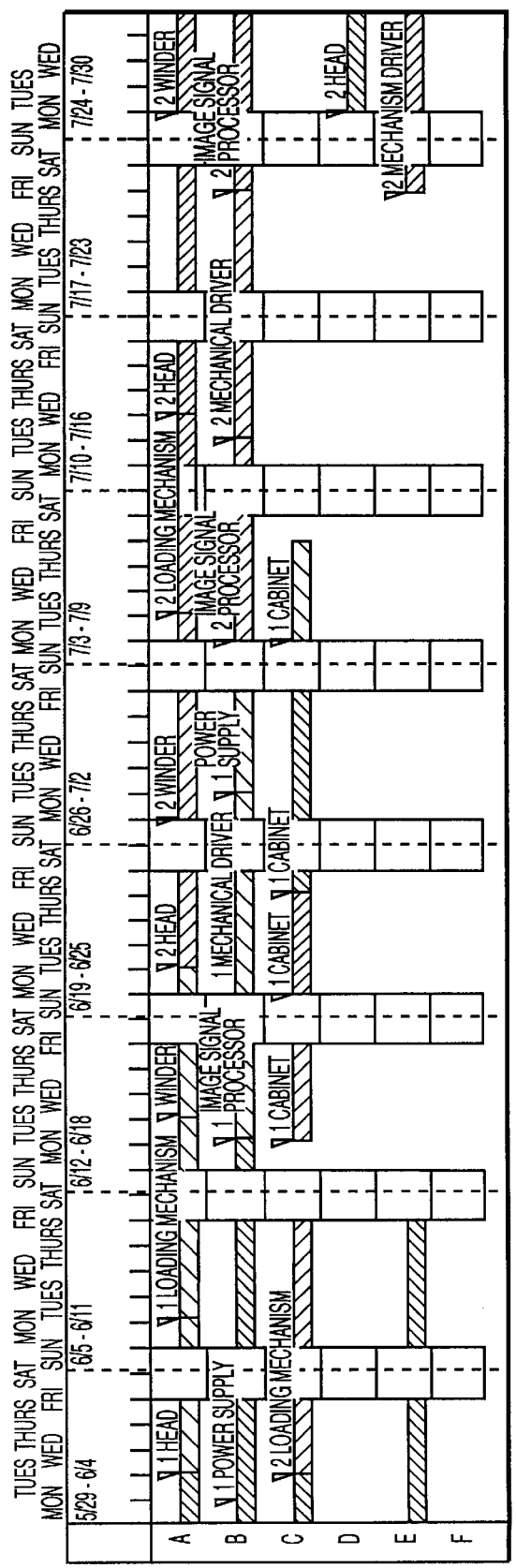
FIG. 7 is a Gantt chart which is continued from the schedule in FIG. 6.
Figure 8:
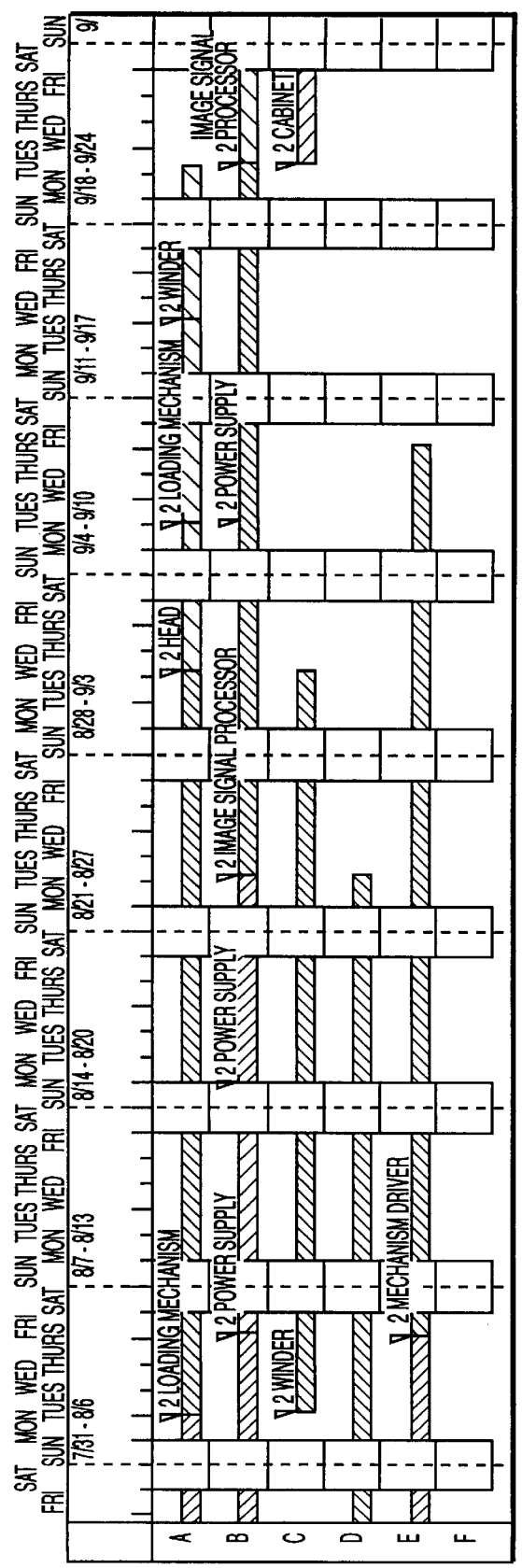
FIG. 8 is a Gantt chart which is continued from the schedule in FIG. 7.

FIGS. 5 to 9 are Gantt charts showing the result of scheduling. FIG. 5 shows the schedule for each design item, with the name of a designer for each process. FIGS. 6 to 9 show the schedule for each designer. Boxes on Saturday and Sunday represent holidays. The holidays of each designer, which are entered with the use of the resource defining means 3, increase these holiday boxes and make the schedule more irregular. The system does not allocate processes on irregularly-set holidays, making it possible to create a schedule which is consistent with the priority and ability and which takes the holidays of each designer into consideration.

Figure 9:
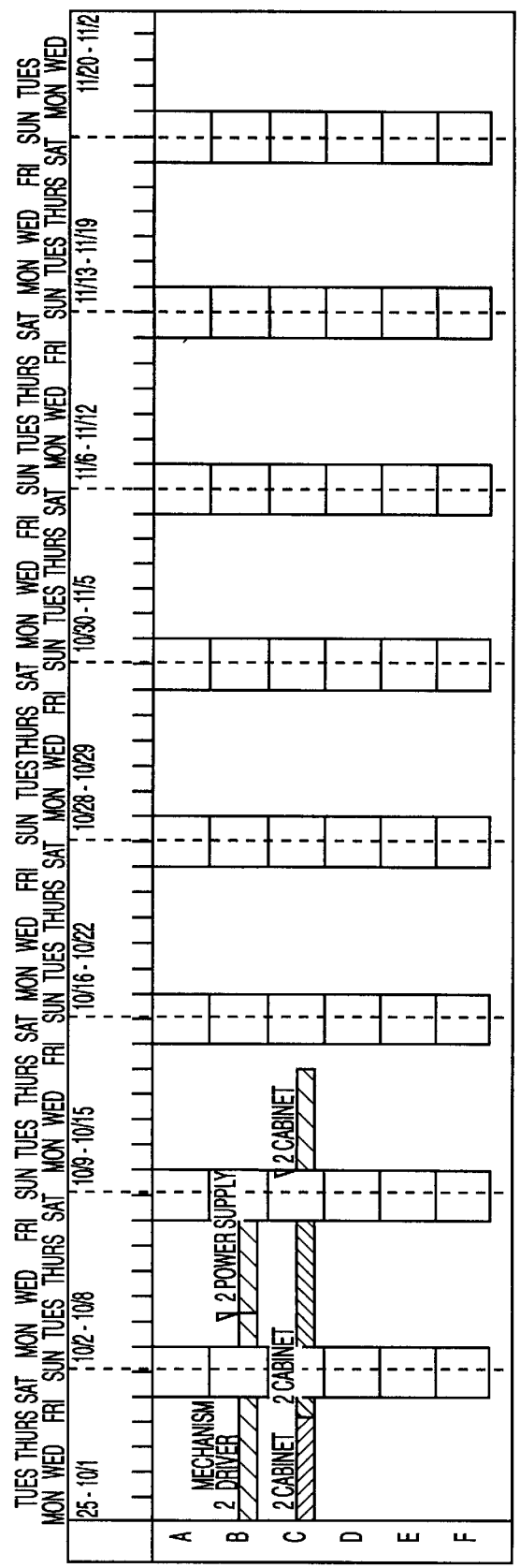
FIG. 9 is a Gantt chart which is continued from the schedule in FIG. 8.

As shown in FIG. 9, the desired end date (completion date) is exceeded by a few days in this schedule. This exceeded number of days varies according to the coefficient α used in calculating the above-described allowable delay amount D. That is, this coefficient α allows the end time to be adjusted in accordance with the completion date. The coefficient α, primarily used for parallel processes, should be decreased to meet the completion date.

Note that, to end the project not too behind the desired end date, it is necessary to set the desired end date so that the project ends a little ahead of the end date of the whole work time calculated by the first PERT calculation. When a plurality of projects share the same designer group, it is also necessary to set the end date so that the project ends a little more ahead of the end date. For a project whose schedule is too tight to do so, emphasis should be placed on ending the project as soon as possible rather than on allocating chief designers to processes. A schedule that is too slack causes chief designers to be allocated to all the processes and the project to end far ahead of the desired end date.

For example, assume that the designers will work on the design of only model 1 in a single project. Table 11 shows the actual end dates and the number of processes to which chief designers are allocated for a plurality of desired end dates.

TABLE 11

| Desired end date | Scheduled date | Number of processes allocated to chief designers |
| --- | --- | --- |
| 6/1 | 7/13 | 6 |
| 7/1 | 7/8 | 19 |
| 7/15 | 7/13 | 22 |
| 8/1 | 8/5 | 25 |
| 9/1 | 8/5 | 25 |
| 10/1 | 9/9 | 26 |

The table shows that a desired end date on or earlier than 6/1 decreases the number of processes to which chief designers are allocated and that the end date is largely behind the desired date. It also shows that a desired end date on or later than 8/1 increases the number of processes to which chief designers are allocated and that it will take less time to end the project. On the other hand, a desired date between 7/1 and 8/1 causes the project to end around a desired end date. Thus, an approximate desired end date, if specified, allows the user to schedule his project with the priority of designers in mind.

As described above, this embodiment evaluates the fitness of processes and designers, takes the time factor into account, and allows the user to well balance them with the use of weights. This enables him to make an optimum schedule which ensures the best balance of the fitness and the time factor.

This embodiment finds the earliest start time and the latest end time of each process based on the time relations of a plurality of processes, and selects a process with the minimum sum of those times, thus selecting processes in descending order of priority.

In addition, because evaluation is based on the result of the PERT calculation, the processes once allocated need not be reallocated, ensuring a reduced scheduling time.

In this embodiment, work is classified by work type (electrical design and mechanical design), each work type being classified by process (concept design, specification preparation, etc.). And, the ability of each resource (designer) is defined according to this classification. However, process data and resource data need not always be entered according to this classification. They may be entered according to the criteria described below.

Data may be entered in any form as long as each of the following can be identified uniquely:
1) Available resource
2) Ability of each resource; that is, a period of time a designer can work.

3) Chief designer, best resource, or fitness for the resource

For example, resources are classified into a plurality of ability groups such as experienced group, middle group, and beginner group. An ability value is set for each ability group, and only information about a group to which each resource belongs is set. This method decreases the number of values that must be entered, making the entry job easier.

Similarly, when there are many processes, they may be classified into several types each of which may have a value.

Suppose that resources belong to sections. In this case, if there are two resources who work on the same item and if the section to which the resource responsible for the preceding process belongs is different from that to which the resource responsible for the following process belongs, an intermediate result must be passed from the preceding resource to the following resource. This requires extra time. Therefore, it may be necessary, in advance, to specify a group of designers who will work on the same item or a plurality of related items. In this case, the following table, which contains items for each group, is used.

TABLE 12

| Section | Designer | Major item |
| --- | --- | --- |
| First development section | A, B, C | 11, 13 |
| Second development section | D, E | 12 |

For chief designers, it is also possible to specify items for which each resource of a group is responsible or to specify a designer who is responsible for each item.

B. Second Embodiment

The following explains the scheduling system and scheduling method used in the second embodiment of this invention. The configuration of the scheduling system according to this embodiment is not described here, because it has the same configuration as the first embodiment.

(1) How is scheduling done in the second embodiment?

The following deals with production plan problems, with particular emphasis on multi-process job shop problems. In the following discussion, consider a mass production line where a job processes three types of products. The product has the shape of a plate, and the system schedules the painting process of this product. The process is divided into the following four: 1. obverse-side grinding, 2. obverse-side painting, 3. reverse-side grinding, and 4. reverse-side painting.

The grinding process requires grinding machines and jigs, and the painting process requires painting machines and jigs. The required jigs vary from product to product, and switching from one jig to another requires the one-hour setup time. There are two grinding machines and two painting machines, each of which may be used for obverse-side process and the reverse-side process. The resource defining means 3 is used to enter the ability of each machine. Table 13 is the ability defining table created by the resource defining means 3.

TABLE 13

| Machine name | Obverse-side grinding | Obverse-side painting | Reverse-side grinding | Reverse-side painting |
| --- | --- | --- | --- | --- |
| A | 1 | x | 1 | x |
| B | 1 | x | 1 | x |
| C | x | 1 | x | 1 |
| D | x | 1 | x | 1 |

The ability defining table is stored in the schedule data 5 as data D.

In this embodiment, the daily production amount of each product type is fixed. Each product type is grouped into lots and, to prevent the quality of a product type from differing from lot to lot, the earliest start time and the completion time of lots are equally distributed within a day. For simplicity, the lot size is such that each lot is processed in one hour. In other words, the work time for each lot is one hour because, in this embodiment, all the machines are assumed to be equal in ability. Table 14 lists the contents, earliest start time, and required-completion time of each lot.

TABLE 14

| Product type | Lot number | Earliest start time | Required time |
|---|---|---|---|
| Product type 1 | 1 | 0 | 10 |
| Product type 1 | 2 | 4 | 14 |
| Product type 1 | 3 | 8 | 18 |
| Product type 1 | 4 | 12 | 22 |
| Product type 1 | 5 | 16 | 26 |
| Product type 2 | 1 | 0 | 10 |
| Product type 2 | 2 | 2 | 12 |
| Product type 2 | 3 | 4 | 14 |
| Product type 2 | 4 | 6 | 16 |
| Product type 2 | 5 | 8 | 18 |
| Product type 2 | 6 | 10 | 20 |
| Product type 2 | 7 | 12 | 22 |
| Product type 2 | 8 | 14 | 24 |
| Product type 3 | 1 | 0 | 10 |
| Product type 3 | 2 | 2 | 12 |
| Product type 3 | 3 | 4 | 14 |
| Product type 3 | 4 | 6 | 16 |
| Product type 3 | 5 | 8 | 18 |
| Product type 3 | 6 | 10 | 20 |
| Product type 3 | 7 | 12 | 22 |
| Product type 3 | 8 | 14 | 24 |

The time is expressed as an integer with the schedule start time as 0. Because there are four processes for each of 21 lots shown in Table 14, a total of 84 processes are candidates for scheduling.

In this embodiment, only the sequence of processes within each lot should be considered. The amount of data shown in Table 14, which is daily data, is processed in 24 hours. Because each of four machines (resources in this embodiment) may be used for surface-side process and reverse-side process, the total capacity is calculated as:

24×8=96(hours)

This capacity is large enough to process the total amount work unless there are restrictions such as setup times and process sequences.

In this embodiment, the project is scheduled using the same data structure as in the project scheduling in the first embodiment. However, in this embodiment, processes cannot be selected in the sequence determined by the PERT calculation because the setup time must be adjusted. Sequencing processes as determined by the PERT calculation causes all product types to be equally selected, increasing the setup time. This means that processes using the same jigs should be grouped to reduce the setup time.

One way to group processes using the same jigs is to increase the lot size. Many studies have been made on the lot size because a larger lot size decreases the setup time. However, adjusting the lot size daily makes scheduling management more complicated. To make management easier, the scheduling unit should be smaller.

In this embodiment, the system groups processes into larger lots, not by changing the lot size, but by reflecting the allocation status at the moment onto the comparison conditions used for selection. More specifically, when a selected process uses the same jigs as those for the last-allocated process, the system adds a special weight to the evaluation value of the process selection. The magnitude of this weight affects the lot size. And, the system adjusts the lot size according to the amount of demand on that day. Therefore, when the demand is large, the setup time is decreased to increase the production; when the demand is small, the setup time is increased to satisfy the desired end time as much as possible.

(2) Estimating an allowable delay amount

Figure 2:
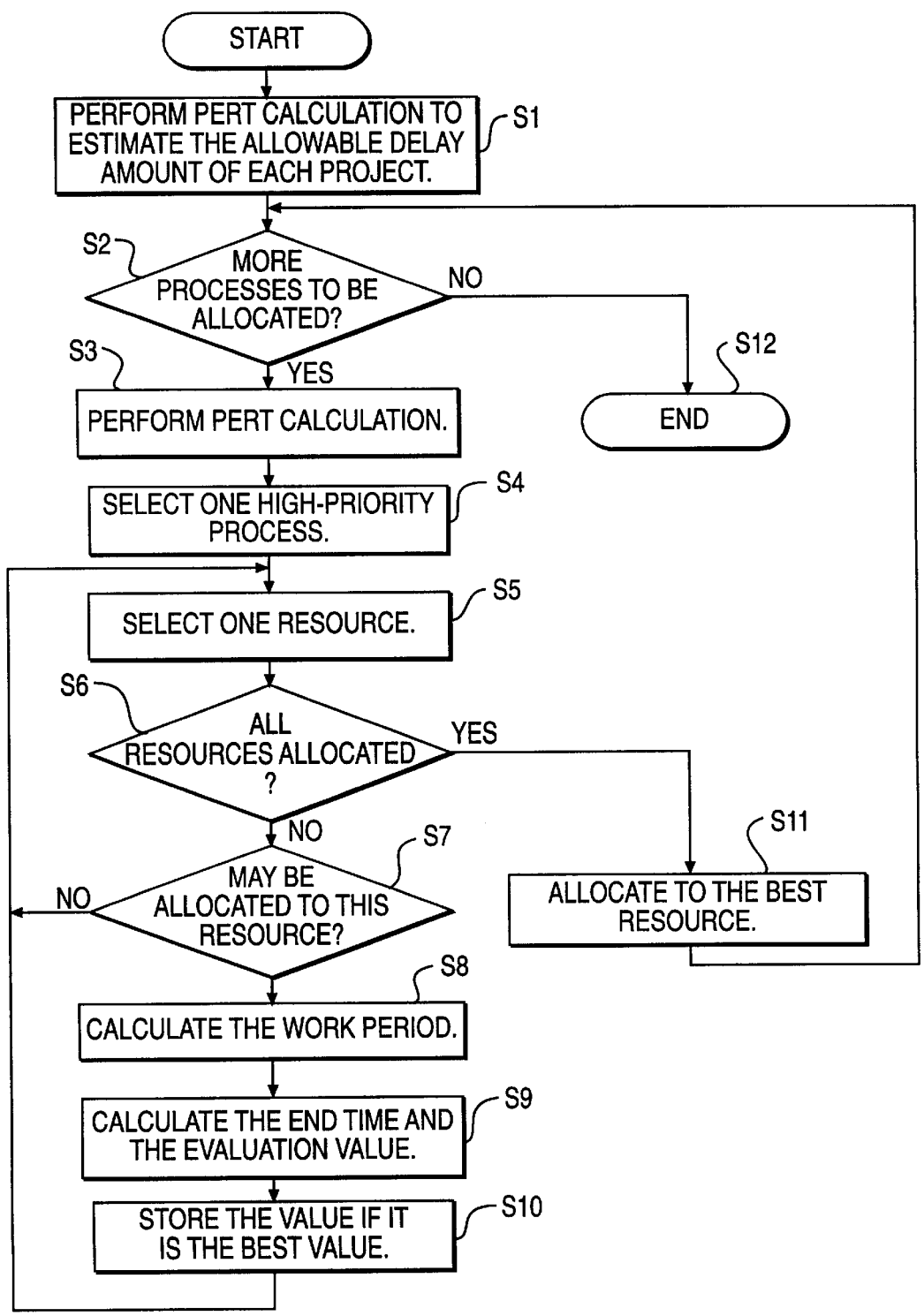
FIG. 2 is a flowchart showing an example of scheduling procedures used in the first and second embodiments of this invention.

Referring to the flowchart in FIG. 2, the following explains how the scheduling system in the second embodiment works. First, the system performs the PERT calculation in step S1. Table 15 shows data F generated as a result of the PERT calculation.

TABLE 15

| ID name | EST | EET | LST | LET | RS | START | END |
|---|---|---|---|---|---|---|---|
| 1-1-1 | 0 | 1 | 6 | 7 | NONE | — | — |
| 1-1-2 | 1 | 2 | 7 | 8 | NONE | — | — |
| 1-1-3 | 2 | 3 | 8 | 9 | NONE | — | — |
| 1-1-4 | 3 | 4 | 9 | 10 | NONE | — | — |
| 1-2-1 | 4 | 5 | 10 | 11 | NONE | — | — |
| . | | | | | | | |
| . | | | | | | | |
| . | | | | | | | |
| 3-7-4 | 15 | 16 | 21 | 22 | NONE | — | — |
| 3-8-1 | 14 | 15 | 20 | 21 | NONE | — | — |
| 3-8-2 | 16 | 17 | 21 | 22 | NONE | — | — |
| 3-8-3 | 17 | 18 | 22 | 23 | NONE | — | — |
| 3-8-4 | 18 | 19 | 23 | 24 | NONE | — | — |

When the PERT calculation is terminated, the weight modifying means 12 estimates the allowable delay amount of the project. The allowable delay amount is a weight to be applied to a machine requiring setup during allocation; it is the amount of delay allowed for a machine requiring setup.

The following formula gives the allowable delay amount as in the project scheduling of the first embodiment:

$$Dn = \frac{(LET - EET) \times \alpha}{\text{Number of allocated processes}}$$

where $\alpha$ is the weight base value, which is set to 1 by the first weight setting means 11a. And, because the difference between the latest end time LET and the earliest end time EET of each lot is always 6 and because the number of processes is 4, the allowable delay amount (Dn) of each lot is calculated as follows:

$$Dn = \frac{6}{4} = 1.5$$

The weight modifying means 12 also estimates the evaluation weight B for the jigs used when selecting a process to be allocated. This is the weight B for selecting, with priority, a process which does not require setup. This weight is applied to the evaluation value of the PERT calculation in order to select a process which does not require setup; the value of this weight determines the level of priority with which to select a process which uses the same jigs as those of the previous process and therefore does not require setup. The weight B is calculated by dividing 24 hours by the allowable setup count of a machine for the day. The allowable setup count is calculated by dividing the total vacant time by the product of the number of resources and one setup time. The following formula gives the weight B:

$$B = 24 \text{ [hours]} \div \frac{\text{Total resource capacity[hours]} - \text{Total manpower[hour]}}{\text{No. of resources} \times \text{One setup time}}$$

In this embodiment, the total resource capacity is 96 hours and the total manpower is 76 hours. Thus, the weight B is calculated as follows.

$$Vd = 24 \div \frac{96 - 76}{4 \times 1} = 4.8 \approx 5$$

(3) Process selection

Then, from a plurality of processes, the system selects a process to which a machine is allocated.

Control is passed to step S2. If there are machines not yet allocated, control is passed to step S3. In step S3, the system performs the PERT calculation. In the first scheduling, the calculation result is the same as that obtained in step S1. Then, in step S4, the system selects one high-priority process. In this embodiment, the priority is defined by the following formula:

$$\min(x)\{EST(x)+LET(x)-J(x)\times 2B\}$$

where, J(x) is 1 if one of machines was last allocated to the process which used the same jigs as ones to be used by the process; otherwise, it is 0. Note that B is multiplied by 2 because the comparison time is the sum of the earliest start time EST and the latest end time LET.

The priority may be defined as follows as in the first embodiment:

Earliest start time EST+(Latest end time LET−Earliest start time EST)×θ where, θ is a function of J(x).

In the beginning, J(x) is 0 for all processes because no resource is allocated to a process. So, the system selects the process "1-1-1" from the earliest processes "1-1-1", "2-1-1", and "3-1-1".

(4) Temporary allocation

Then, the system temporarily allocates a machine to a selected process.

In step S5, the temporary allocating means 7 selects one of machines "A" to "D". They may be selected in any sequence. In this embodiment, they are selected in the sequence "D" to "A". First, the system selects "D".

In step S7, the system references data D (ability defining table) in Table 13 and checks if the machine may be allocated to the process selected in step S4. Because the process "1-1-1" is a surface-side grinding process, the system determines that the process cannot be allocated to machine "D" and passes control back to step S5. In step S5, the system selects "C" (unavailable for surface-side grinding) and then "B". In step S7, the temporary allocating means 7 references data "D" (ability defining table) in Table 13 and determines that "B" may be allocated to the process and passes control to step S7.

In step S8, the temporary allocating means 7 references data D (ability defining table) in Table 13 to find the work time of the process for the machine. Because the standard work time of each process is 1 in this embodiment as described above and because the ability setting of machine "B" is 1, the work time is calculated as follows:

Standard work time(1 day)/Ability setting(1)=1 day

Then, in step S9, the temporary allocating means 7 finds the end time of the process "1-1-1" when machine "A" is allocated to it. Because no process is allocated in the beginning, the allocation starts at 0:00 and ends at 1:00. It then performs the PERT calculation to find the evaluation value of the allocation of machine "B" to the process "11-1-1".

Before performing the PERT calculation, the temporary allocating means 7 temporarily copies data F in Table 15 to some other area, and temporarily sets the earliest start time EST and the latest start time LST of the process "1-1-1" to 0:00, and the earliest end time EET and the latest end time LET to 1:00. And, during the PERT calculation, it re-calculates only the earliest start time EST and the earliest end time EET. In this case, data is not updated because it is the same as the original data.

(5) Finding the evaluation value of the combination

Then, the system finds the evaluation value of the allocation of the machine to the process. In this embodiment, the evaluation value V is the sum of the time evaluation value for the allocation time (Vd) and the setup evaluation value of resource selection (Vr). The smaller the value, the better the evaluation.

The first evaluating means 9a calculates the time evaluation value for the allocation time (Vd) based on the above PERT calculation. The delay amount of the whole job when the machine is allocated to the process is calculated as follows:

$$S = \begin{cases} EET \text{ of the whole job after temporary allocation} - \\ EET \text{ of the whole job before temporary allocation} & (> 0) \\ 0 & \text{(otherwise)} \end{cases}$$

In this case, S=0.

The time evaluation value for the allocation time (Vd) is calculated by the following formula:

$$Vd = S + \frac{T}{2}$$

where, T is the number of days when the process is terminated with the schedule start time being 0. Therefore, the time evaluation value Vd is calculated by the following formula:

$$Vd = 0 + \frac{1}{2} = 0.5$$

Then, the second evaluating means 9b finds the setup evaluation value for resource selection (Vr). The setup evaluation value Vr is set as follows:

$$Vr = \begin{cases} D1 & \text{(When there is need for setup for jigs)} \\ 0 & \text{(When there is no need for setup for jigs)} \end{cases}$$

When no process is allocated, there is no need for setup. In this case, Vr=0.

The resource determining means 8 finds the evaluation value V from the time evaluation value Vd, obtained by the first evaluating means 9a, and the setup evaluation value Vr obtained by the second evaluating means 9b. Here, the evaluation value for the combination of the process "1-1-1" and machine "B" is as follows:

V=0.5+0=0.5

(6) Determining the best machine

The system then determines the best machine.

In step S10, the resource determining means 8 checks the evaluation value V if it is best and, if it is, stores the value. The smaller this evaluation value, the better the evaluation. Because the obtained evaluation value is best for the process "1-1-1", the resource determining means 8 stores the evaluation value (0.5) and machine "B".

(7) Evaluation of other machines

The system finds the evaluation value V for other machines in the similar manner.

To do so, the system passes control back to step S5 and, through steps S5 to S10, finds an evaluation value for the next machine "A". More specifically, it temporarily allocates machine "A" to the process "11-1-1" to machine "A". Because the end time is 1:00 which is the same as when machine "B" was temporarily allocated to the process and because machine "A" does not require setup as with machine "B", the evaluation value is 0.5. The best machine is not updated because this value is the same as that of machine "B". After completing the evaluation of all the machines, the system passes control to step S10.

(8) Allocating the process to the best machine

Finally, the system allocates the machine whose evaluation value is best to the process.

That is, in step S11, the process allocating means 6 allocates machine "B" which has the best evaluation value to the process "11-1-1". As a result, data F is changed as shown in Table 16.

TABLE 16

| ID name | EST | EET | LST | LET | RS | START | END |
|---|---|---|---|---|---|---|---|
| 1-1-1 | 0 | 1 | 6 | 7 | B | 0 | 1 |
| 1-1-2 | 1 | 2 | 7 | 8 | NONE | — | — |
| 1-1-3 | 2 | 3 | 8 | 9 | NONE | — | — |
| 1-1-4 | 3 | 4 | 9 | 10 | NONE | — | — |
| 1-2-1 | 4 | 5 | 10 | 11 | NONE | — | — |
| . | | | | | | | |
| . | | | | | | | |
| . | | | | | | | |
| 3-7-4 | 15 | 16 | 21 | 22 | NONE | — | — |
| 3-8-1 | 14 | 15 | 20 | 21 | NONE | — | — |
| 3-8-2 | 16 | 17 | 21 | 22 | NONE | — | — |
| 3-8-3 | 17 | 18 | 22 | 23 | NONE | — | — |
| 3-8-4 | 18 | 19 | 23 | 24 | NONE | — | — |

In the table, the resource (RS) column for the process "1-1-1" contains "B", the start time (START) column contains the earliest start time EST (0:00), and the end time (END) column contains the earliest end time EET (1:00), respectively.

The schedule is created by repeating the above processing. Table 17 shows the final result.

TABLE 17

| ID name | EST | EET | LST | LET | RS | START | END |
|---|---|---|---|---|---|---|---|
| 1-1-1 | 0 | 1 | 6 | 7 | B | 0 | 1 |
| 1-1-2 | 1 | 2 | 7 | 8 | D | 1 | 2 |
| 1-1-3 | 2 | 3 | 8 | 9 | B | 2 | 3 |
| 1-1-4 | 3 | 4 | 9 | 10 | D | 3 | 4 |
| 1-2-1 | 4 | 5 | 10 | 11 | B | 4 | 5 |
| . | | | | | | | |
| . | | | | | | | |
| . | | | | | | | |
| 3-7-4 | 15 | 16 | 21 | 22 | C | 21 | 22 |
| 3-8-1 | 14 | 15 | 20 | 21 | B | 18 | 19 |
| 3-8-2 | 16 | 17 | 21 | 22 | C | 19 | 20 |

TABLE 17-continued

| ID name | EST | EET | LST | LET | RS | START | END |
|---|---|---|---|---|---|---|---|
| 3-8-3 | 17 | 18 | 22 | 23 | B | 21 | 22 |
| 3-8-4 | 18 | 19 | 23 | 24 | C | 22 | 23 |

Figure 10:
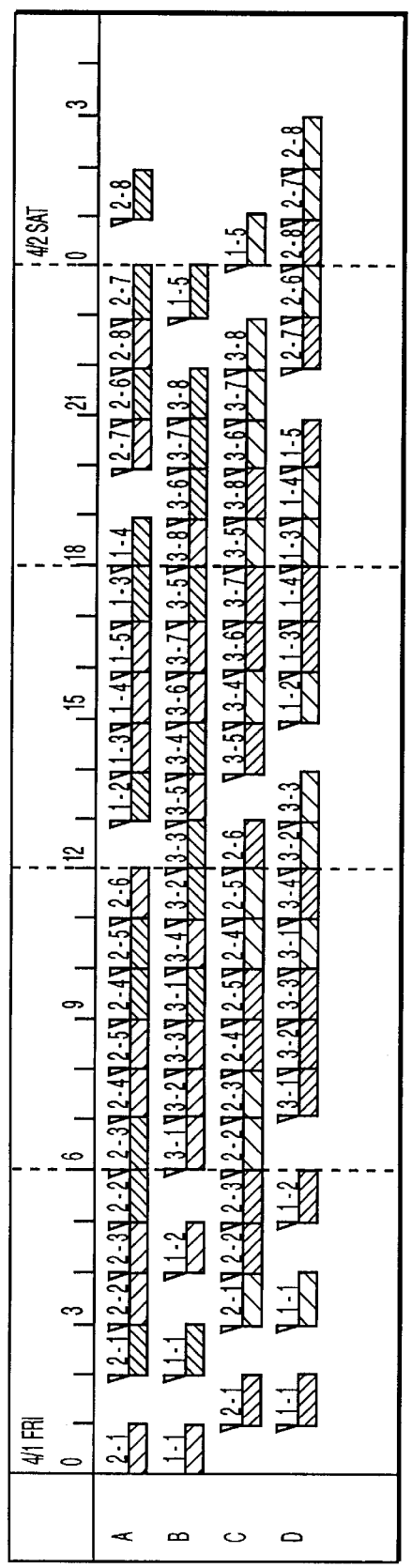
FIG. 10 is a Gantt chart showing the result of scheduling in the second embodiment of this invention, which shows the schedule for each machine.
Figure 11:
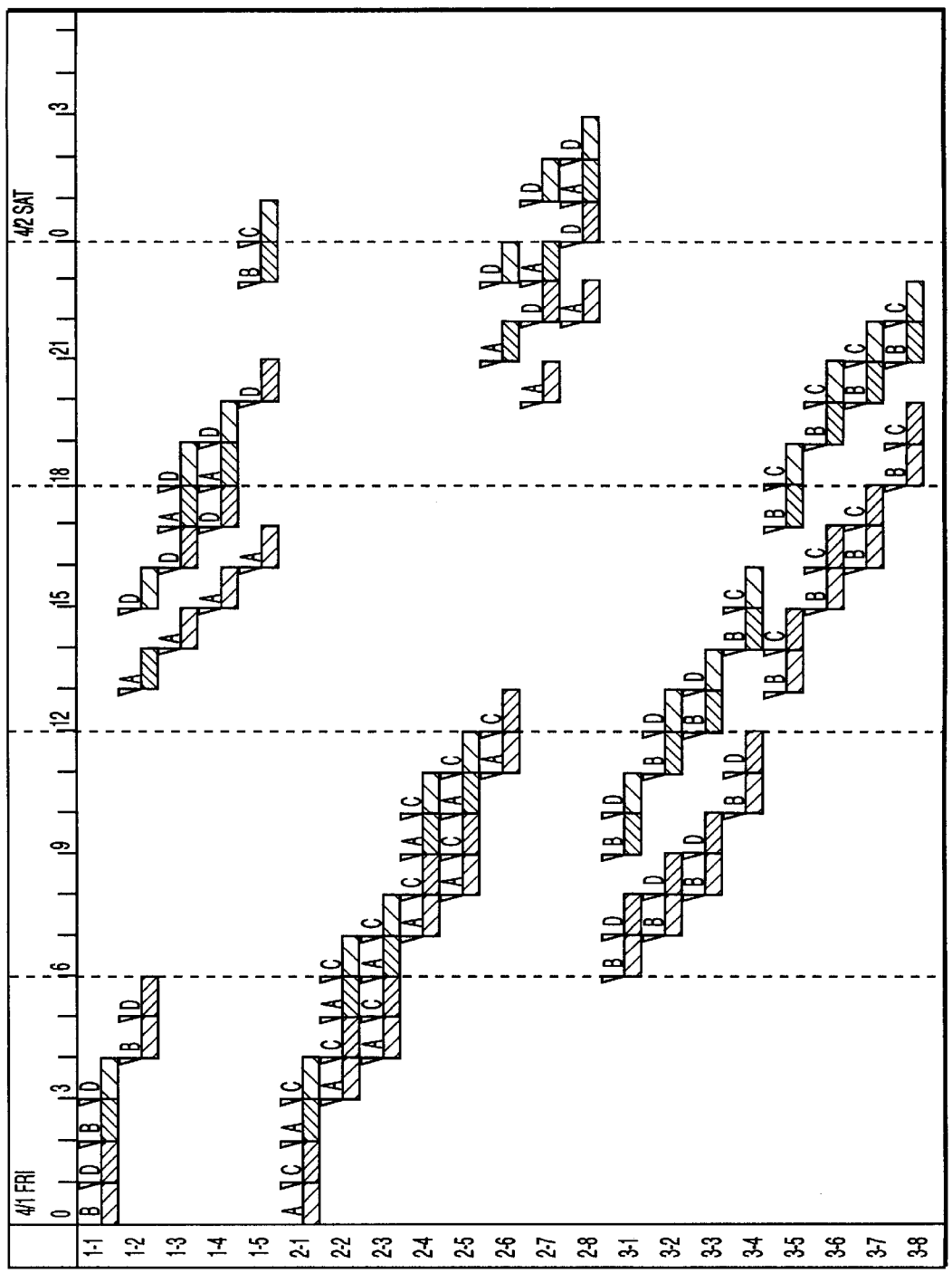
FIG. 11 is a Gantt chart showing the result of scheduling in the second embodiment of this invention, which shows the schedule for each process.

FIGS. 10 and 11 show the Gantt charts for the scheduling results. As shown in those figures, processes not requiring jig replacement has priority over those requiring jig replacement. And, machines not requiring jig replacement are allocated, with priority, to those processes not requiring jig replacement. In this way, this system automatically creates a schedule which takes jig replacement into consideration. Allocation priority, which is adjusted based on the anticipation of machine usage, allows the schedule to be created according to the timing in which jigs are to be replaced.

The following shows an example of scheduling to reduce the production amount as a whole. Table 18 lists the lot contents, start times, and completion times.

TABLE 18

| Product type | Lot number | Earliest start time | Required time |
|---|---|---|---|
| Product type 1 | 1 | 0 | 10 |
| Product type 1 | 2 | 4 | 14 |
| Product type 1 | 3 | 8 | 18 |
| Product type 1 | 4 | 12 | 22 |
| Product type 1 | 5 | 16 | 26 |
| Product type 2 | 1 | 0 | 10 |
| Product type 2 | 2 | 4 | 14 |
| Product type 2 | 3 | 8 | 18 |
| Product type 2 | 4 | 12 | 22 |
| Product type 2 | 5 | 16 | 26 |
| Product type 3 | 1 | 0 | 10 |
| Product type 3 | 2 | 4 | 14 |
| Product type 3 | 3 | 8 | 18 |
| Product type 3 | 4 | 12 | 22 |
| Product type 3 | 5 | 16 | 26 |

Because the number of spare days for the completion date of each process are the same as those for the example described above, the value of the allowable delay amount D remains the same. The total manpower is 60 (15 lots×4 processes). The weight B is calculated as follows:

$$B = 2.67 \approx 2.5$$

The value of 2.5 is used instead of 3 to make the result of subsequent operation (multiplied by 2) an integer value.

Figure 12:
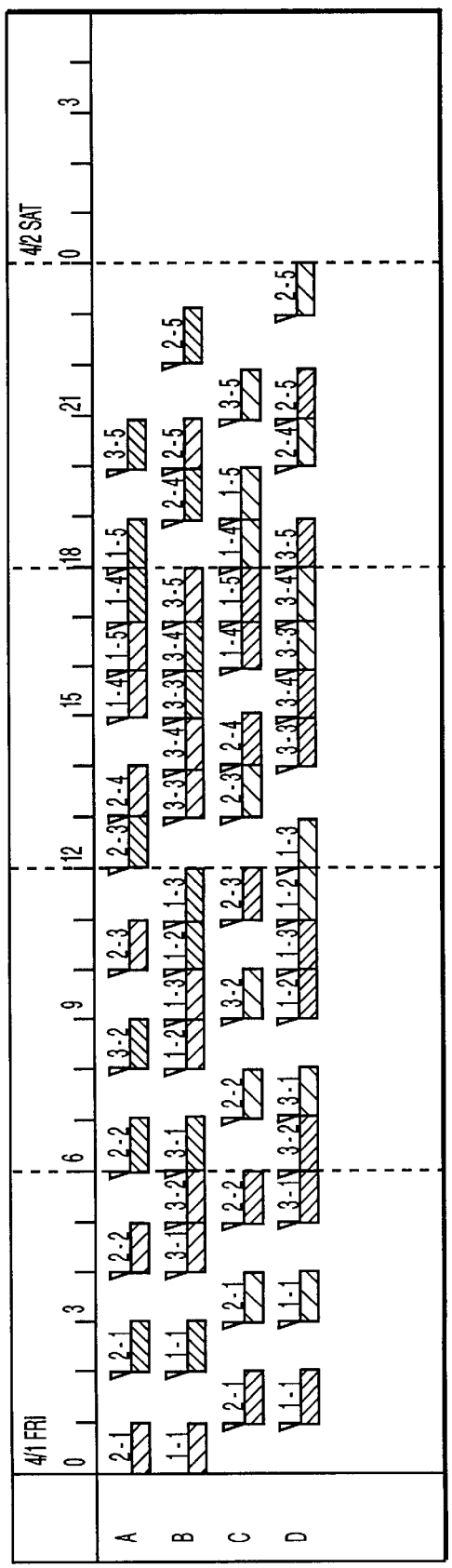
FIG. 12 is a Gantt chart showing the result of an example of scheduling to reduce the production amount as a whole in the second embodiment of this invention, which shows the schedule for each machine.
Figure 13:
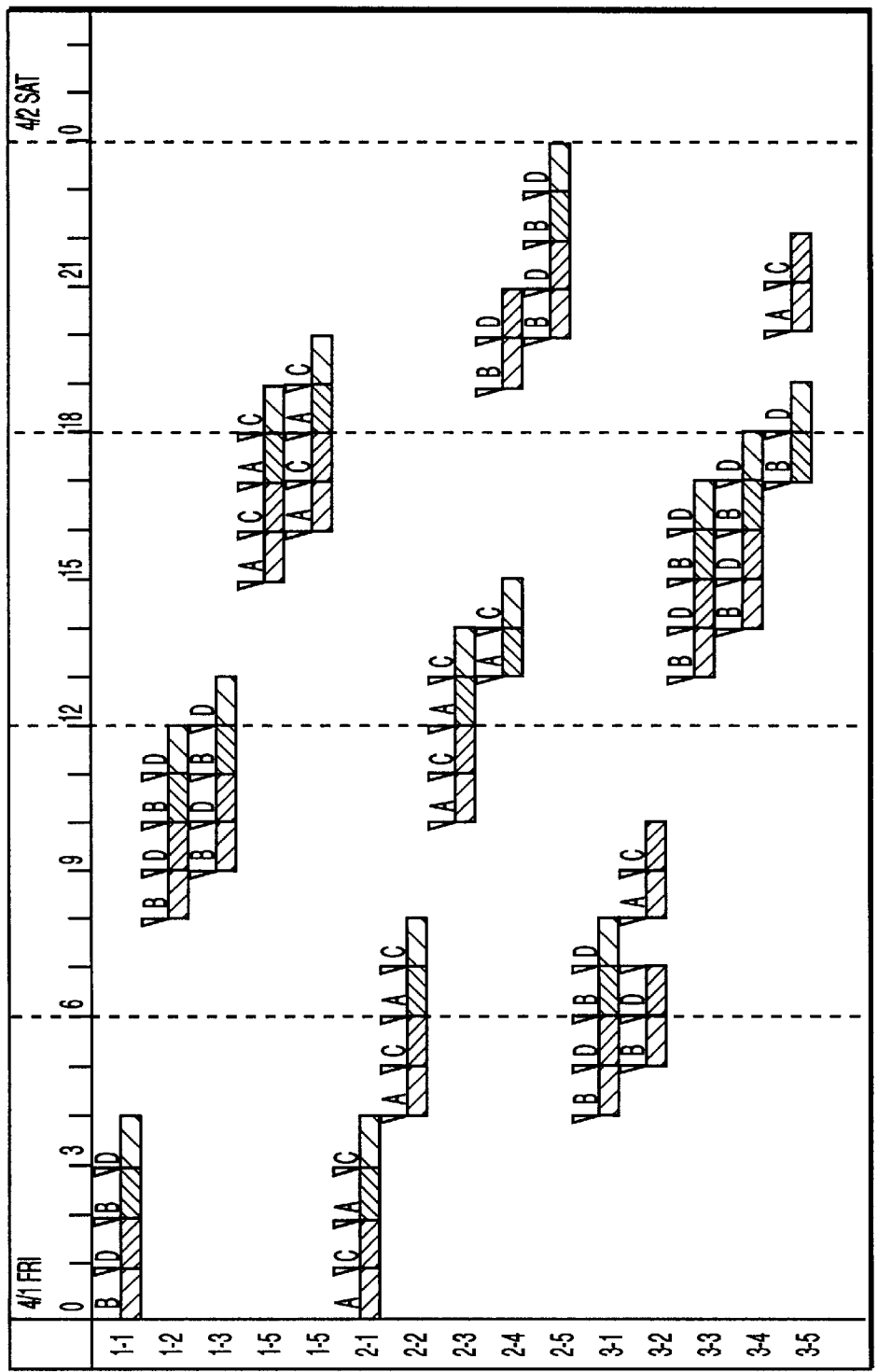
FIG. 13 is a Gantt chart showing the result of an example of scheduling to reduce the production amount as a whole in the second embodiment of this invention, which shows the schedule for each process.

FIGS. 12 and 13 are Gantt charts showing the results. These figures show that the system allows the user to schedule the job through setup adjustment so that the work ends within the day in most cases and that each lot ends not too much behind the desired end time.

As described above, this embodiment considers the time factor while evaluating the setup time and uses a weight to balance the time factor, making it possible to create an optimal schedule ensuring a balance between machine usage efficiency and the time factor. In addition, when selecting a process, the embodiment finds the earliest start time and the latest end time of each process based on the time relation between processes and, after a weight is applied to the sum of the earliest start time and latest end time, selects a process with the minimum result first, making it possible to select processes while considering the priority as well as setup time amount.

C. Other Embodiments

This invention may be embodied in other specific forms without departing from the spirit or essential characteristics thereof. It also includes other embodiments described below.

Although the earliest start time EST and the latest end time LET of each process are used during process selection in the above embodiment, the earliest end time EET and the latest start time LST may also be used.

For example, this invention may be applied not only to a scheduling problem where a designer or a machine is allocated to a process but also to a scheduling problem such as the allocation of a plurality of rooms or the allocation of cars.

In addition, the fitness evaluation of a resource is not limited to the priority of a process; it may be some pre-set criteria. For example, the fitness evaluation may be done based on whether or not a resource satisfies pre-set ability criteria.

EFFECT OF INVENTION

As described above, a scheduling system according to this invention evaluates the fitness of a plurality of resources for each of a plurality of fixed-sequenced processes as well as the time factor of those processes, making the fitness and the time factor well balanced. In addition, when a plurality of resource types are allocated to each of a plurality of processes, a scheduling system according to this invention well balances the setup time and time factor of the above-mentioned processes. It also allows the user to apply a weight to the balance between the fitness and the time factor or to the balance between the setup time and the time factor.

Thus, a scheduling system according to this invention enables the user to create a flexible schedule in a simple knowledge representation form; in particular, the system makes the scheduling of a multi-process, complex machine problem easier. For example, in project scheduling, it may be used to create individual schedules; in production scheduling, it may be used to create a multi-process, multi-function job shop schedule.

While a preferred embodiment has been described, variations thereto will occur to those skilled in the art within the scope of the present inventive concepts which are delineated by the following claims.

What is claimed is:

1. A scheduling computer system for generating a scheduling chart, the computer system comprising:

resource defining means for inputting an attribute of each of a plurality of resources;

process defining means for inputting an attribute of each of a plurality of processes which are processed in a predefined sequence;

time setting means for inputting the processing start time and desired processing end time of each of said plurality of processes;

process selecting means for sequentially selecting a process, to which a resource is to be allocated, from said plurality of processes;

temporary allocating means for temporarily allocating each of said plurality of resources to the process selected by said process selecting means;

first evaluating means for evaluating the end time of a sequence of said plurality of processes by finding the end time of the sequence of said plurality of processes after said temporary allocation and for defining a resulting time evaluation value as the first criterion;

second evaluating means for evaluating the fitness of a resource for a process based on the attribute of the resource inputted by said resource defining means and on the attribute of the process inputted by said process defining means and for defining a resulting fitness evaluation value as the second criterion;

resource determining means for calculating an evaluation value for the combination of a process and a resource by evaluating said first criterion and second criterion for each of said plurality of resources and for determining the optimum resource for the process by comparing said evaluation values of all the resources;

process allocating means for sequentially allocating a resource determined by said resource determining means to a process selected by said process selecting means as a final result; and means for generating the scheduling chart illustrating the process to which the resources have been allocated by the process allocating means, wherein said process selecting means does not select processes to which resources have been already allocated by said process allocating means as objects of said temporary allocation.

2. A scheduling computer system as claimed in claim 1, wherein said time setting means sets the processing start time and desired processing end time of a sequence of said plurality of processes.

3. A scheduling computer system as claimed in claim 1, wherein said time setting means sets a processing start time and a desired processing end time of each of said plurality of processes.

4. A scheduling computer system as claimed in claim 1, further comprising first weight setting means for setting the first weight for weighting said resource with respect to the end time of said sequence of said plurality of processes, wherein said second evaluating means uses said first weight to evaluate the fitness of the corresponding resource for the corresponding process.

5. A scheduling computer system as claimed in claim 4, further comprising weight modifying means for modifying said first weight, set by said first weight setting means, according to a change of criteria in the evaluation criteria, when the criteria in at least one of a time evaluation value, created by said first evaluating means, and a fitness evaluation value, created by said second evaluating means, must be changed.

6. A scheduling computer system as claimed in claim 5, wherein said process selecting means calculates an evaluation value, based on the time relation among said plurality of processes, by using the earliest startable time and the allowable latest end time of each process and, based on this evaluation valued, selects a process.

7. A scheduling computer system as claimed in claim 1, wherein said process selecting means calculates an evaluation value, based on the time relation among said plurality of processes, by using the earliest processing start time and the allowable latest processing end time of each process and, based on this evaluation value, selects a process.

8. A scheduling computer system as claimed in claim 1, wherein said process selecting means calculates, based on the time relation among said plurality of processes, an evaluation value by generally evaluating the earliest processing start time and the allowable latest end time of each process as well as the correlation between the allocation status of each resource and each process at that time and, based on the evaluation value, selects a process.

9. A scheduling computer system as claimed in claim 8, further comprising second weight setting means for determining how high a priority is given to the corresponding process when determining said correlation between the allocation status of each resource and each process.

10. A scheduling computer system as claimed in claim 9, further comprising weight modifying means for modifying, when criteria for evaluating said correlation between the allocation status of each resource and each process must be changed, said second weight, set by said second weight setting means, according to a change in the criteria.

11. A scheduling computer system as claimed in claim 8, wherein said process selecting means selects a particular point in time between said earliest processing start time and said latest processing time based on said correlation between the status of each resource and each process at that time and determines the evaluation value as said evaluation value.

12. A scheduling computer system as claimed in claim 8, wherein said process selecting means calculates said evaluation value using the earliest start time and the allowable latest end time.

13. A scheduling computer system as claimed in claim 1, wherein said process defining means defines an additional resource for use in each process in addition to the resources defined by said resource defining means, and said second evaluating means increases the evaluation value of said fitness when two or more processes using said additional resource are allocated consecutively.

14. A scheduling computer system as claimed in claim 13, wherein said process selecting means calculates, based on the time relation among said plurality of processes, an evaluation value by generally evaluating the earliest processing start time and the allowable latest end time of each process as well as the correlation between the allocation status of each resource and each process at that time and, based on the evaluation value, selects a process.

15. A scheduling computer system as claimed in claim 14, wherein, when a process for which the same additional resources are defined as the those defined for this process is allocated to a resource at that time, said process selecting means evaluates highly said correlation between the allocation status of resources and each process.

16. A scheduling computer system as claimed in claim 14, wherein said process selecting means calculates said evaluation value using the earliest start time and the allowable latest end time.

17. A scheduling computer system as in one of claims 1 to 16, wherein said first evaluating means finds the first criterion by performing PERT (Program Evaluation and Review Technique) calculation.

18. A computer-implemented scheduling method for generating a scheduling chart, the method comprising:
    a first step for inputting an attribute of each of a plurality of resources;
    a second step for inputting an attribute of each of a plurality of processes which are processed in a predefined sequence;
    a third step for inputting the processing start time and desired processing end time of each of said plurality of processes;
    a fourth step for sequentially selecting a process to which a resource is to be allocated, from said plurality of processes;
    a fifth step for temporarily allocating each of said plurality of resources to the process selected in said fourth step;
    a sixth step for evaluating the end time of a sequence of said plurality of processes by finding the end time of the sequence of said plurality of processes after said temporary allocation and for defining a resulting time evaluation value as the first criterion;
    a seventh step for evaluating the fitness of a resource for a process based on the attribute of the resource inputted in said first step and on the attribute of the process inputted in said second step and for defining a resulting fitness evaluation value as the second criterion;
    an eighth step for calculating an evaluation value for the combination of a process and a resource by evaluating said first criterion and second criterion for each of said plurality of resources and for determining the optimum resource for the process by comparing said evaluation values of all the resources;
    a ninth step for sequentially allocating a resource determined in said eight step to a process selected in said fourth step as a final result; and
    a tenth step for generating the scheduling chart illustrating the processes to which the resources have been allocated,
    wherein, in said fourth step, processes to which resources have been already allocated in said ninth step are not selected.

19. A computer-implemented scheduling method as claimed in claim 18, further comprising an eleventh step for setting the first weight for weighting said resource, with respect to the end time of said sequence of said plurality of processes, wherein, in said seventh step, said first weight is used to evaluate the fitness of the corresponding resource for the corresponding process.

20. A computer-implemented scheduling method as claimed in claim 19, further comprising a twelfth step for modifying said first weight, set by said eleventh step, according to a change of criteria in the evaluation criteria, when the criteria in at least one of a time evaluation value, created by said sixth step, and a fitness evaluation value, created by said seventh step, must be changed.

21. A computer-implemented scheduling method as claimed in claim 18, wherein said fourth step calculates, based on the time relation among said plurality of processes, an evaluation value by using the earliest processing start time and the allowable latest processing time of each process and, based on this evaluation value, selects a process.

22. A computer-implemented scheduling method as claimed in claim 18, wherein said fourth step calculates, based on the time relation among said plurality of processes, an evaluation value by evaluating the earliest end start time and the allowable latest processing time of each process as well as the correlation between the allocation status of each resource and each process at that time and, based on the evaluation value, selects a process.

23. A computer-implemented scheduling method as claimed in claim 22, further comprising a thirteenth step for determining how high a priority is given to the corresponding process when determining said correlation between the allocation status of each resource and each process.

24. A computer-implemented scheduling method as claimed in claim 18, wherein said second step defines an additional resource for use in each process in addition to the resources defined by said first step, and said seventh step increases the evaluation value of said fitness when two or more processes using said additional resource are allocated consecutively.

25. A computer-implemented scheduling method as claimed in claim 24, wherein said fourth step calculates, based on the time relation among said plurality of processes, an evaluation value by generally evaluating the earliest processing start time and the allowable latest end time of each process as well as the correlation between the allocation status of each resource and each process at that time and, based on the evaluation value, selects a process.

26. A computer-implemented scheduling method as in one of claims 18 to 25, wherein said sixth step finds the first criterion by performing PERT (Program Evaluation and Review Technique) calculation.

* * * * *

UNITED STATES PATENT AND TRADEMARK OFFICE
CERTIFICATE OF CORRECTION

PATENT NO. :
DATED : 5,826,236
INVENTOR(S) : October 20, 1998
Narimatsu et al.

It is certified that error appears in the above-identified patent and that said Letters Patent is hereby corrected as shown below:

Claim 6, column 32, line 48, "valued" should read --value--.

Claim 18, column 34, line 8, "eight" should read --eighth--.

Signed and Sealed this

Seventh Day of March, 2000

Attest:

Q. TODD DICKINSON

*Attesting Officer*    *Commissioner of Patents and Trademarks*